US012574926B2

(12) United States Patent
Guo et al.

(10) Patent No.: US 12,574,926 B2
(45) Date of Patent: Mar. 10, 2026

(54) COMMUNICATION METHOD AND COMMUNICATION APPARATUS

(71) Applicant: HUAWEI TECHNOLOGIES CO., LTD., Shenzhen (CN)

(72) Inventors: Zhiheng Guo, Beijing (CN); Feng Wang, Shenzhen (CN); Yi Long, Beijing (CN); Xiang Gao, Beijing (CN); Jiansong Gan, Beijing (CN); Ye Liu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 258 days.

(21) Appl. No.: 18/474,622

(22) Filed: Sep. 26, 2023

(65) Prior Publication Data

US 2024/0023096 A1     Jan. 18, 2024

Related U.S. Application Data

(63) Continuation of application No. PCT/CN2022/084337, filed on Mar. 31, 2022.

(30) Foreign Application Priority Data

Apr. 5, 2021     (CN) ......................... 202110364486.7
Aug. 5, 2021     (CN) ......................... 202110894503.8

(51) Int. Cl.
*H04W 72/1268*     (2023.01)
*H04L 5/00*     (2006.01)
*H04W 72/0453*     (2023.01)

(52) U.S. Cl.
CPC ....... *H04W 72/1268* (2013.01); *H04L 5/0051* (2013.01); *H04W 72/0453* (2013.01)

(58) Field of Classification Search
CPC ............... H04W 72/04; H04W 72/044; H04W 72/0453; H04W 72/12; H04W 72/1263;
(Continued)

(56) References Cited

U.S. PATENT DOCUMENTS

2020/0187210 A1     6/2020     Xie et al.
2022/0353032 A1*     11/2022     Abdelghaffar ........ H04L 5/0051

FOREIGN PATENT DOCUMENTS

JP     2020536450 A     12/2020
WO     WO-2021159989 A1 *     8/2021     ............ H04W 72/51

OTHER PUBLICATIONS

3GPP, "User Equipment (UE) radio access capabilities (Release 16)", Jun. 2021, TS 38.306 V16.5.0, pp. 1-153 (Year: 2021).*
(Continued)

*Primary Examiner* — Paul H. Masur
(74) *Attorney, Agent, or Firm* — HAUPTMAN HAM, LLP

(57) ABSTRACT

A communication method includes reporting fourth and fifth band sets. The fourth band set and the fifth band set include a twelfth band and a thirteenth band. A maximum quantity of layers supported by uplink transmission on the twelfth band of the fourth band set is 1. A maximum quantity of layers supported by uplink transmission on the thirteenth band of the fourth band set is 2. A maximum quantity of layers supported by uplink transmission on the twelfth band of the fifth band set is 2. A maximum quantity of layers supported by uplink transmission on the thirteenth band of the fifth band set is 2. The method also includes receiving fourth information that indicates transmitter (Tx) switching on the twelfth band and the thirteenth band. The method further includes performing Tx switching on the twelfth band and the thirteenth band based on parameters of a sounding reference signal.

22 Claims, 3 Drawing Sheets

Band A | Carrier Z | Carrier Z | Carrier Z

Band B | Carrier X | Carrier Y | Carrier X

(58) Field of Classification Search
CPC ............. H04W 72/1268; H04W 72/50; H04W 72/51; H04L 5/003; H04L 5/0048; H04L 5/0051; H04L 5/0053
See application file for complete search history.

(56) References Cited

OTHER PUBLICATIONS

3GPP, "Radio Resource Control (RRC) protocol specification (Release 16)", Jun. 2021, 3GPP TS 38.331 V16.5.0, pp. 1-959 (Year: 2021).*
Machine Translation of WO 2021159989, Aug. 19, 2021 (Year: 2021).*
3rd Generation Partnership Project; Technical Specification Group Radio Access Network; NR;Radio Resource Control (RRC) protocol specification(Release 16),3GPP TS 38.331 V16.4.1 (Mar. 2021), total:949pages.
3rd Generation Partnership Project; Technical Specification Group Radio Access Network;NR;User Equipment (UE) radio access capabilities(Release 16),3rd Generation Partnership Project;3GPP TS 38.306 V16.4.0 (Mar. 2021), total:151 pages.
3GPP TSG RAN WG1 #100bis R1-2002190 "Remaining issues on uplink Tx switching", China Telecom, e-Meeting, Apr. 20-30, 2020,total 7 pages.
International Search Report issued in corresponding International Application No. PCT/CN2022/084337, dated Jun. 20, 2022, pp. 1-10.
3GPP TSG RAN WG1 #104b-e R1-2103387:"Discussions on enhancements for UL Tx switching", Huawei, HiSilicon, Apr. 7, 2021, total 8 pages.
3GPP TSG RAN WG1 #104-e R1-2101270:"Discussions on enhancements for UL Tx switching", Huawei, HiSilicon, Jan. 19, 2021, total 5 pages.
3GPP TSG RAN WG2 #113bis-e R2-2104137:"Introduction of Rel-17 Tx switching enhancements", Huawei, HiSilicon, China Telecom, CATT, Apr. 2, 2021, total 13 pages.
3GPP TSG RAN WG2 #113bis-e R2-2104136:"RAN2 impact to support R17 UL Tx switching enhancements", Huawei, HiSilicon, China Telecom, CATT, Apr. 2, 2021, total 6 pages.
Japanese Office Action issued in corresponding Japanese Application No. 2023-561217, dated Dec. 2, 2024, pp. 1-11.
OPPO:"Discussion on Tx Switching between Two Uplink Carriers", 3GPP TSG RAN WG1 #100bis, e-Meeting, Apr. 20-30, 2020, R1-2001743, total 4 pages.
India Office Action issued in corresponding India Application No. 202337075364, dated Jun. 5, 2025, pp. 1-6.

* cited by examiner

| Band A | Carrier Z | Carrier Z | Carrier Z |
|--------|-----------|-----------|-----------|
| Band B | Carrier X | Carrier Y | Carrier X |
|--------|-----------|-----------|-----------|
FIG. 3
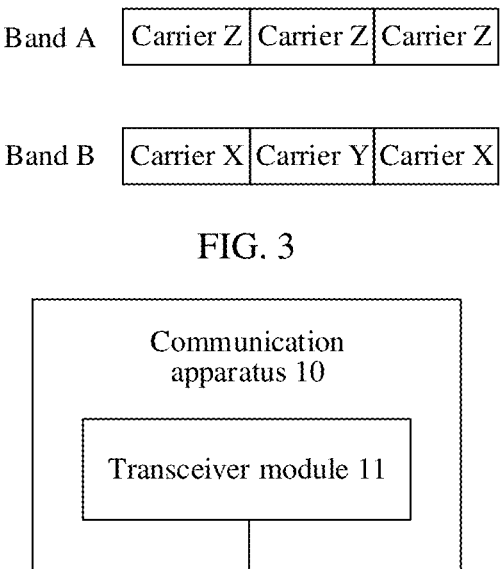
FIG. 4
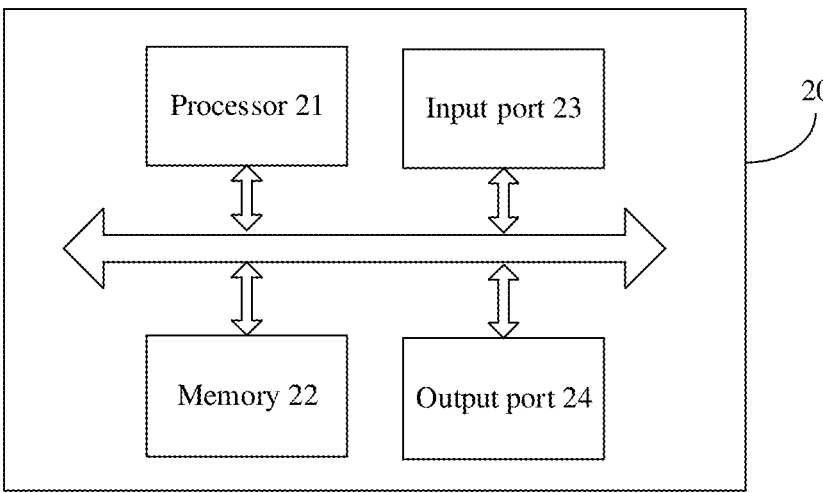
FIG. 5

COMMUNICATION METHOD AND COMMUNICATION APPARATUS

CROSS-REFERENCE TO RELATED APPLICATIONS

This application is a continuation of International Application No. PCT/CN2022/084337, filed on Mar. 31, 2022, which claims priority to Chinese Patent Application No. 202110364486.7, filed on Apr. 5, 2021 and Chinese Patent Application No. 202110894503.8, filed on Aug. 5, 2021. All of the aforementioned patent applications are hereby incorporated by reference in their entireties.

TECHNICAL FIELD

This application relates to the communication field, and more specifically, to a communication method and a communication apparatus.

BACKGROUND

In some scenarios, user equipment (UE) performs an uplink transmission with a base station on a plurality of bands. When each band includes only one carrier, the UE may switch a radio frequency chain between different carriers, to support a data transmission with the base station on a plurality of bands.

However, when the UE performs an uplink transmission on a plurality of bands and at least one of the bands includes a plurality of carriers, a transmission failure may occur. Therefore, how to improve a success rate of performing an uplink transmission on a band including a plurality of carriers is a problem that needs to be considered.

SUMMARY

According to a communication method in embodiments of this application, a case in which an uplink transmission fails in some time periods because a terminal device needs to perform carrier switching can be avoided.

According to a first aspect, a communication method is provided. The method may be performed by a terminal device, or may be performed by a component (for example, a chip or a circuit) configured in the terminal device. The method includes: sending first information to a network device, where the first information indicates whether a terminal device can simultaneously perform a transmission on different carriers in one carrier set through one radio frequency chain; and receiving second information from the network device, where the second information indicates the terminal device to perform a first transmission on a first carrier, and the first carrier is a carrier in a first carrier set.

For example, the first information may be capability information of the terminal device. The capability information may indicate whether the terminal device can simultaneously perform a transmission on different carriers in one carrier set through one radio frequency chain. In other words, the capability information indicates whether switching duration is required when the terminal device performs radio frequency chain switching on different carriers in one carrier set. In other words, the capability information indicates whether the terminal device needs to switch a radio frequency chain on different carriers in one carrier set.

In a possible implementation, the first information indicates that the terminal device cannot simultaneously perform a transmission on different carriers in one carrier set through one radio frequency chain, or the first information indicates that switching duration is required when the terminal device performs radio frequency chain switching on different carriers in one carrier set, or the first information indicates that the terminal device needs to switch a radio frequency chain on different carriers in one carrier set.

In another possible implementation, the first information indicates that the terminal device can simultaneously perform a transmission on different carriers in one carrier set through one radio frequency chain, or the first information indicates that no switching duration is required when the terminal device performs radio frequency chain switching on different carriers in one carrier set, or the first information indicates that the terminal device does not need to switch a radio frequency chain on different carriers in one carrier set.

Correspondingly, the network device receives the first information from the terminal device. Based on the first information, the network device determines whether the terminal device can simultaneously perform an uplink transmission on different carriers in one carrier set through one radio frequency chain, or the network device determines whether switching duration is required when the terminal device performs radio frequency chain switching on different carriers in one carrier set, or the network device determines whether the terminal device needs to switch a radio frequency chain on different carriers in one carrier set. When the terminal device can simultaneously perform a transmission on different carriers in one carrier set through one radio frequency chain, no switching duration is required when the terminal device switches one radio frequency chain on different carriers in one carrier set. In other words, if one radio frequency chain is on one carrier in the carrier set, it means that the radio frequency chain is also on all carriers in the carrier set, or a quantity of radio frequencies of the terminal device on one carrier in the carrier set is X. In this case, a quantity of radio frequencies on all carriers in the carrier set is also X, or radio frequency chain switching does not need to be performed on different carriers in the carrier set. When the terminal device cannot simultaneously perform a transmission on different carriers in one carrier set through one radio frequency chain, switching duration is required when the terminal device switches one radio frequency chain on different carriers in one carrier set.

Therefore, according to the communication method provided in this embodiment of this application, whether the terminal device can simultaneously perform a transmission on different carriers in one carrier set through one radio frequency chain is indicated by reporting the first information to the network device, so that the network device can reserve a first time period for an uplink transmission of a terminal device that needs to perform radio frequency chain switching and that cannot simultaneously perform a transmission on different carriers in one carrier set through one radio frequency chain, to avoid a case in which an uplink transmission fails on the terminal device that cannot simultaneously perform a transmission on different carriers in one carrier set through one radio frequency chain.

It should be understood that the terminal device may report the first information to the network device when registering with and accessing a network, or may send the first information to the network device when there is an uplink transmission requirement. This is not limited in this application.

It should be further understood that the carrier set may be a set of carriers having a same feature. For example, one carrier set may be a set of all carriers belonging to a band. In another example, one carrier set may be a set of all carriers in a plurality of bands. When a plurality of bands are close in frequency domain and/or bandwidths of the plurality of bands are small, one carrier set may be a set of all carriers in the plurality of bands.

In another possible implementation, the terminal device may not send the first information to the network device. A base station and the terminal device are preconfigured. When the terminal device does not send the first information to the network device, it indicates that the terminal device can simultaneously perform a transmission on different carriers in one carrier set through one radio frequency chain, or it indicates that no switching duration is required when the terminal device performs radio frequency chain switching on different carriers in one carrier set, or it indicates that the terminal device does not need to switch a radio frequency chain on different carriers in one carrier set. Alternatively, when the terminal device does not send the first information to the network device, it indicates that the terminal device cannot simultaneously perform a transmission on different carriers in one carrier set through one radio frequency chain, or it indicates that switching duration is required when the terminal device performs radio frequency chain switching on different carriers in one carrier set, or it indicates that the terminal device needs to switch a radio frequency chain on different carriers in one carrier set.

With reference to the first aspect, in some implementations of the first aspect, the method further includes: determining whether to perform an uplink transmission on the first carrier in a first time period, where a start moment of the first time period is after a transmission end moment of the second information, and an end moment of the first time period is before a start moment of the first transmission.

With reference to the first aspect, in some implementations of the first aspect, the determining whether to perform an uplink transmission on the first carrier in a first time period includes: determining, based on a quantity of ports for a second transmission and a quantity of ports for the first transmission, whether to perform an uplink transmission on the first carrier in the first time period, or determining, based on a quantity of radio frequency chains on at least one carrier in the first carrier set, whether to perform an uplink transmission on the first carrier in the first time period, where the second transmission is one transmission that precedes the first transmission and that is closest to the first transmission in time domain order.

With reference to the first aspect, in some implementations of the first aspect, the determining, based on a quantity of ports for a second transmission and a quantity of ports for the first transmission, whether to perform an uplink transmission on the first carrier in the first time period includes: When the second transmission is a 1-port transmission on the second carrier, an operating status of UE is that a 2-port transmission is not supported on the second carrier, and the first transmission is a 1-port transmission on the first carrier, the terminal device determines not to perform an uplink transmission on at least the first carrier and the second carrier in the first time period, where the first carrier and the second carrier are different carriers in the first carrier set. When the second transmission is a 2-port transmission on the second carrier, or the second transmission is a 1-port transmission on the second carrier and an operating status of UE is that a 2-port transmission is supported on the second carrier, and the first transmission is a 1-port or 2-port transmission on the first carrier, the terminal device determines not to perform an uplink transmission on at least the first carrier and the second carrier in the first time period, where the first carrier and the second carrier are different carriers in the first carrier set. When the second transmission is only a 2-port transmission on the first carrier, and the first transmission is also only a 2-port transmission on the first carrier, in this case, the terminal device does not need to perform radio frequency chain switching, and the terminal device determines that an uplink transmission may be performed on the first carrier in the first time period. In other words, there is no first time period between the first transmission and the second transmission. When the second transmission is a concurrency of two carriers in the first carrier set (for example, the second transmission is a 1-port transmission on the first carrier and at the same time a 1-port transmission on the second carrier, and the first carrier and the second carrier are different carriers in the first carrier set), or the second transmission is a 1-port transmission on the first carrier, an operating status of UE during the second transmission is that a 2-port transmission is not supported on the first carrier, and the first transmission is a 2-port transmission on the first carrier, the terminal device determines not to perform an uplink transmission on at least the first carrier in the first time period. When the first transmission is a 1-port transmission on the first carrier, the second transmission is a 2-port transmission on the second carrier, or the second transmission is a 1-port transmission on the second carrier and an operating status of UE is that a 2-port transmission is supported on the second carrier, the terminal device determines not to perform an uplink transmission on at least the first carrier and the second carrier in the first time period, where the first carrier and the second carrier are different carriers in the first carrier set. When the first transmission is a 2-port transmission on the first carrier, the second transmission is a 2-port transmission on the second carrier, or the second transmission is a 1-port transmission on the second carrier and an operating status of UE is that a 2-port transmission is supported on the second carrier, the terminal device determines not to perform an uplink transmission on at least the first carrier and the second carrier in the first time period, where the first carrier and the second carrier are different carriers in the first carrier set. When the first transmission is a 2-port transmission on the first carrier, or the first transmission is a 1-port transmission on the first carrier and an operating status of UE is that a 2-port transmission is supported on the first carrier, and the second transmission is a 2-port transmission on the second carrier, the terminal device determines not to perform an uplink transmission on at least the first carrier and the second carrier in the first time period, where the first carrier and the second carrier are different carriers in the first carrier set. The terminal device includes two radio frequency chains, and the first carrier set includes the first carrier and the second carrier.

With reference to the first aspect, in some implementations of the first aspect, the determining, based on a quantity of radio frequency chains on at least one carrier in the first carrier set, whether to perform an uplink transmission on the first carrier in the first time period includes: When the first transmission is a transmission on the first carrier, the second transmission is a transmission on another carrier other than the first carrier in the first carrier set, there is a total of one radio frequency chain on all carriers in the first carrier set during the second transmission, there is also a total of one radio frequency chain on all the carriers in the first carrier set during the first transmission, or a quantity of radio frequency chains on all the carriers in the first carrier set does not change during the first transmission and the second transmission, or in other words, the UE performs a 1-port first transmission on only the first carrier in the first carrier set during the first transmission, and in this case, the terminal device performs radio frequency chain switching in the first time period, the terminal device determines not to perform an uplink transmission on at least the first carrier in the first time period. In this case, it may also be understood that a carrier on which the radio frequency chain is located in the second transmission is different from a carrier on which the radio frequency chain is located in the first transmission, and radio frequency chain switching needs to be performed between the two transmissions. When both the first transmission and the second transmission are transmissions on the first carrier, there is a total of one radio frequency chain on all carriers in the first carrier set during the second transmission, there is also a total of one radio frequency chain on all the carriers in the first carrier set during the first transmission, or in other words, a quantity of radio frequency chains on all the carriers in the first carrier set does not change during the first transmission and the second transmission, or in other words, the UE performs a 1-port first transmission on only the first carrier in the first carrier set during the first transmission, and in this case, the terminal device does not need to perform radio frequency chain switching, the terminal device determines that an uplink transmission can be performed on the first carrier in the first time period, or that there is no first time period between the first transmission and the second transmission. When the first transmission is a concurrency of two carriers in the first carrier set, the second transmission is a 2-port transmission on any carrier in the first carrier set, there are a total of two radio frequency chains on all carriers in the first carrier set during the second transmission (in other words, there are two radio frequency chains on a carrier on which the second transmission is located), there are also a total of two radio frequency chains on all the carriers in the first carrier set during the first transmission (in other words, there is one radio frequency chain on each of the first carrier and the second carrier), or in other words, a quantity of radio frequency chains on all the carriers in the first carrier set does not change during the first transmission and the second transmission, the terminal device determines not to perform an uplink transmission on at least the first carrier and the second carrier in the first time period. In this case, it may also be understood that two radio frequency chains are on one carrier in the first carrier set during the second transmission, two radio frequency chains are on two carriers in the first carrier set during the first transmission, and at least one radio frequency chain needs to be switched between the two transmissions. When the first transmission is a 2-port transmission on any carrier in the first carrier set, there are a total of two radio frequency chains on all carriers in the first carrier set during the first transmission (in other words, there are two radio frequency chains on a carrier on which the first transmission is located), the second transmission is a concurrency of two carriers in the first carrier set (for example, the second transmission is a 1-port transmission on the first carrier and at the same time a 1-port transmission on the second carrier, and the first carrier and the second carrier are different carriers in the first carrier set), or the second transmission is a 1-port transmission on the first carrier and there is one radio frequency chain on the second carrier at the same time, or the second transmission is a 1-port transmission on the second carrier and there is one radio frequency chain on the first carrier at the same time, the first carrier and the second carrier are different carriers in the first carrier set, and a quantity of radio frequency chains on all the carriers in the first carrier set does not change during the first transmission and the second transmission, the terminal device determines not to perform an uplink transmission on at least the first carrier and the second carrier in the first time period. In this case, it may also be understood that two radio frequency chains are on one carrier in the first carrier set during the second transmission, two radio frequency chains are on two carriers in the first carrier set during the first transmission, and at least one radio frequency chain needs to be switched between the two transmissions. When the first transmission is a 1-port or 2-port transmission on the first carrier, the second transmission is a 1-port or 2-port transmission on another carrier other than the first carrier in the first carrier set, and there are always two radio frequency chains on all carriers in the first carrier set during the first transmission and the second transmission (in other words, there are two radio frequency chains on a carrier on which the first transmission is located, there are also two radio frequency chains on a carrier on which the second transmission is located, and the carriers on which the first transmission and the second transmission are located are different), the terminal device determines not to perform an uplink transmission on at least the first carrier and the second carrier in the first time period. When the first transmission is a 1-port transmission on the first carrier, the second transmission is a 1-port or 2-port transmission on the second carrier, there is one radio frequency chain on the first carrier, there is also one radio frequency chain on the second carrier during the first transmission, there are two radio frequency chains on the second carrier during the second transmission, the first carrier and the second carrier are different carriers in the first carrier set, and there are always two radio frequency chains on all carriers in the first carrier set during the first transmission and the second transmission, the terminal device determines not to perform an uplink transmission on at least the first carrier and the second carrier in the first time period. The terminal device includes two radio frequency chains, and the first carrier set includes the first carrier and the second carrier.

With reference to the first aspect, in some implementations of the first aspect, the determining, based on a quantity of ports for a second transmission and a quantity of ports for the first transmission, whether to perform an uplink transmission on the first carrier in the first time period includes: determining, based on the first information, the quantity of ports for the second transmission, and the quantity of ports for the first transmission, whether to perform an uplink transmission on the first carrier in the first time period, or determining, based on the first information, the quantity of ports for the second transmission, the quantity of ports for the first transmission, and a maximum quantity of layers on at least one carrier in the first carrier set, whether to perform an uplink transmission on the first carrier in the first time period; or the determining, based on a quantity of radio frequency chains on at least one carrier in the first carrier set, whether to perform an uplink transmission on the first carrier in the first time period includes: determining, based on the first information and the quantity of radio frequency chains on the at least one carrier in the first carrier set, whether to perform an uplink transmission on the first carrier in the first time period, or determining, based on the first information, the quantity of radio frequency chains on the at least one carrier in the first carrier set, and a maximum quantity of layers on the at least one carrier in the first carrier set, whether to perform an uplink transmission on the first carrier in the first time period.

With reference to the first aspect, in some implementations of the first aspect, the method further includes: sending third information to the network device, where the third information indicates at least one of the following: a maximum quantity of layers supported by an uplink transmission of the terminal device on different carriers in the first carrier set, a maximum quantity of ports of sounding reference signal (SRS) resources of the terminal device on a band to which different carriers in the first carrier set belong, and a maximum quantity of SRS resources in an SRS resource set in a non-codebook transmission scenario of the terminal device on different carriers in the first carrier set.

With reference to the first aspect, in some implementations of the first aspect, the first carrier set includes at least two carriers on one band, or the first carrier set includes at least two carriers on a plurality of bands, and the at least two carriers include the first carrier and a second carrier.

With reference to the first aspect, in some implementations of the first aspect, an identifier of the second carrier is the same as an identifier of the first carrier, or an identifier of the second carrier is different from an identifier of the first carrier.

With reference to the first aspect, in some implementations of the first aspect, an identifier of the first carrier is different from an identifier of the second carrier, the first carrier and the second carrier belong to a first carrier group, and the first carrier group has a group identifier.

With reference to the first aspect, in some implementations of the first aspect, a bandwidth of the first carrier is greater than a bandwidth of a third carrier, where the first carrier and the third carrier belong to the first carrier set, or a frequency of the first carrier is less than a frequency of a third carrier, where the first carrier and the third carrier belong to the first carrier set.

With reference to the first aspect, in some implementations of the first aspect, the first carrier is a carrier with the largest bandwidth in the first carrier set, which helps fully use spectrum resources.

With reference to the first aspect, in some implementations of the first aspect, the first carrier is a carrier with the lowest frequency in the first carrier set, which helps improve cell coverage.

With reference to the first aspect, in some implementations of the first aspect, the method further includes: receiving fourth information from the network device, where the fourth information indicates that the network device expects to schedule the first carrier for an uplink transmission, and the fourth information is carried in radio resource control (RRC) signaling, or the fourth information is carried in downlink control information DCI. In this solution, a carrier on which a radio frequency chain is located can be flexibly configured or flexibly scheduled.

With reference to the first aspect, in some implementations of the first aspect, the method further includes: performing a third transmission to the network device on a fourth carrier, where the third transmission is one transmission that precedes the first transmission and that is closest to the first transmission in time domain order, and the fourth carrier does not belong to the first carrier set; and performing a fourth transmission to the network device on a fifth carrier, where the fourth transmission is one transmission that precedes the third transmission and that is closest to the third transmission in time domain order, and the first carrier and the fifth carrier are different carriers in the first carrier set.

With reference to the first aspect, in some implementations of the first aspect, the method further includes: sending fifth information to the network device, where the fifth information indicates a status of the terminal device when the terminal device performs radio frequency chain switching to perform the first transmission, and the status of the terminal device includes at least one of the following: a quantity of radio frequency chains of the terminal device on at least one carrier in the first carrier set, and a quantity of ports for an uplink transmission supported by the terminal device on at least one carrier in the first carrier set.

According to a second aspect, a communication method is provided. The method may be performed by a network device, or may be performed by a component (for example, a chip or a circuit) configured in the network device. The method includes: receiving first information from a terminal device, where the first information indicates whether the terminal device can simultaneously perform a transmission on different carriers in one carrier set through one radio frequency chain; and sending second information to the terminal device, where the second information indicates the terminal device to perform a first transmission on a first carrier, and the first carrier is a carrier in a first carrier set.

With reference to the second aspect, in some implementations of the second aspect, the method further includes: determining whether to perform an uplink transmission on the first carrier in the first time period, where a start moment of the first time period is after a transmission end moment of the second information, and an end moment of the first time period is before a start moment of the first transmission.

With reference to the second aspect, in some implementations of the second aspect, the method further includes: determining, based on a quantity of ports for a second transmission and a quantity of ports for the first transmission, whether to perform an uplink transmission on the first carrier in the first time period, or determining, based on a quantity of radio frequency chains on at least one carrier in the first carrier set, whether to perform an uplink transmission on the first carrier in the first time period, where the second transmission is one transmission that precedes the first transmission and that is closest to the first transmission in time domain order, a start moment of the first time period is after a transmission end moment of the second information, and an end moment of the first time period is before a start moment of the first transmission.

With reference to the second aspect, in some implementations of the second aspect, the determining, based on a quantity of ports for a second transmission and a quantity of ports for the first transmission, whether to perform an uplink transmission on the first carrier in the first time period includes: determining, based on the first information, the quantity of ports for the second transmission, and the quantity of ports for the first transmission, whether to perform an uplink transmission on the first carrier in the first time period, or determining, based on the first information, the quantity of ports for the second transmission, the quantity of ports for the first transmission, and a maximum quantity of layers on at least one carrier in the first carrier set, whether to perform an uplink transmission on the first carrier in the first time period; or the determining, based on a quantity of radio frequency chains on at least one carrier in the first carrier set, whether to perform an uplink transmission on the first carrier in the first time period includes: determining, based on the first information and the quantity of radio frequency chains on the at least one carrier in the first carrier set, whether to perform an uplink transmission on the first carrier in the first time period, or determining, based on the first information, the quantity of radio frequency chains on the at least one carrier in the first carrier set, and a maximum quantity of layers on the at least one carrier in the first carrier set, whether to perform an uplink transmission on the first carrier in the first time period.

With reference to the second aspect, in some implementations of the second aspect, the method further includes: receiving third information from the terminal device, where the third information indicates a maximum quantity of layers supported by an uplink transmission of the terminal device on different carriers in the first carrier set. With reference to the second aspect, in some implementations of the second aspect, a bandwidth of the first carrier is greater than a bandwidth of a third carrier, where the first carrier and the third carrier belong to the first carrier set, or a frequency of the first carrier is less than a frequency of a third carrier, where the first carrier and the third carrier belong to the first carrier set.

With reference to the second aspect, in some implementations of the second aspect, the method further includes: sending fourth information to the terminal device, where the fourth information indicates that a network device expects to schedule the first carrier for an uplink transmission, and the fourth information is carried in radio resource control RRC signaling, or the fourth information is carried in downlink control information DCI.

With reference to the second aspect, in some implementations of the second aspect, the method further includes: receiving a third transmission from the terminal device on a fourth carrier, where the third transmission is one transmission that precedes the first transmission and that is closest to the first transmission in time domain order, and the fourth carrier does not belong to the first carrier set; and receiving a fourth transmission from the terminal device on a fifth carrier, where the fourth transmission is one transmission that precedes the third transmission and that is closest to the third transmission in time domain order, and the first carrier and the fifth carrier are different carriers in the first carrier set.

With reference to the second aspect, in some implementations of the second aspect, the first carrier set includes at least two carriers on one band, or the first carrier set includes at least two carriers on a plurality of bands, and the at least two carriers include the first carrier and a second carrier.

With reference to the second aspect, in some implementations of the second aspect, an identifier of the second carrier is the same as an identifier of the first carrier, or an identifier of the second carrier is different from an identifier of the first carrier.

With reference to the second aspect, in some implementations of the second aspect, an identifier of the first carrier is different from an identifier of the second carrier, the first carrier and the second carrier belong to a first carrier group, and the first carrier group has a group identifier.

With reference to the second aspect, in some implementations of the second aspect, the method further includes: receiving fifth information from the terminal device, where the fifth information indicates a status of the terminal device when the terminal device performs radio frequency chain switching to perform the first transmission, and the status of the terminal device includes at least one of the following: a quantity of radio frequency chains of the terminal device on at least one carrier in the first carrier set, and a quantity of ports for an uplink transmission supported by the terminal device on at least one carrier in the first carrier set.

According to a third aspect, a communication method is provided. The method may be performed by a network device, or may be performed by a component (for example, a chip or a circuit) configured in the network device. The method includes: sending first information to a terminal device, where the first information indicates the terminal device to communicate with the network device on a first carrier, and the first carrier is a carrier in a plurality of carriers on a first band. The network device performs an uplink transmission with the terminal device on the first carrier.

With reference to the third aspect, in some implementations of the third aspect, the first information includes an identifier of the first carrier.

With reference to the third aspect, in some implementations of the third aspect, the first carrier is a carrier with the largest bandwidth in the plurality of carriers on the first band; and/or the first carrier is a carrier whose bandwidth is greater than a first threshold in the plurality of carriers on the first band; and/or the first carrier is a carrier with the smallest frequency in the plurality of carriers on the first band; and/or the first carrier is a carrier whose frequency is less than a second threshold in the plurality of carriers on the first band; and/or the first carrier is a carrier with the smallest load in the plurality of carriers on the first band; and/or the first carrier is a carrier whose load is less than a third threshold in the plurality of carriers on the first band.

With reference to the third aspect, in some implementations of the third aspect, first information is carried in a radio resource control RRC message or downlink control information (DCI).

According to a fourth aspect, a communication method is provided. The method may be performed by a terminal device, or may be performed by a component (for example, a chip or a circuit) configured in the terminal device. The method includes: receiving first information from a network device, where the first information indicates the terminal device to communicate with the network device on a first carrier, and the first carrier is a carrier in a plurality of carriers on a first band. The terminal device performs an uplink transmission with the network device on the first carrier.

With reference to the fourth aspect, in some implementations of the fourth aspect, the first information includes an identifier of the first carrier.

With reference to the fourth aspect, in some implementations of the fourth aspect, the first carrier is a carrier with the largest bandwidth in the plurality of carriers on the first band; and/or the first carrier is a carrier whose bandwidth is greater than a first threshold in the plurality of carriers on the first band; and/or the first carrier is a carrier with the smallest frequency in the plurality of carriers on the first band; and/or the first carrier is a carrier whose frequency is less than a second threshold in the plurality of carriers on the first band; and/or the first carrier is a carrier with the smallest load in the plurality of carriers on the first band.

With reference to the fourth aspect, in some implementations of the fourth aspect, the first information is carried in a radio resource control RRC message or downlink control information DCI.

According to a fifth aspect, a communication method is provided. The method may be performed by a terminal device, or may be performed by a component (for example, a chip or a circuit) configured in the terminal device. The method includes: performing an uplink transmission with a network device on a tenth carrier, where the tenth carrier is a carrier in a second carrier set; receiving third information from the network device, where the third information indicates the terminal device to perform a sounding reference signal SRS transmission on an eleventh carrier; and determining not to perform an uplink transmission on the tenth carrier and a ninth carrier in a third time period, where the ninth carrier may be a carrier that is in the second carrier set and that can perform radio frequency chain switching with the tenth carrier, and the eleventh carrier is not a carrier in the second carrier set.

With reference to the fifth aspect, in some implementations of the fifth aspect, the third time period is a larger value in a second time period and a first time period, or the third time period is a sum of the second time period and the first time period, where the second time period is a time period in which a radio frequency chain is adjusted during switching on the tenth carrier and the eleventh carrier, and the first time period is a time period in which a radio frequency chain is adjusted during switching on the tenth carrier and the ninth carrier.

With reference to the fifth aspect, in some implementations of the fifth aspect, the method further includes: reporting the third time period to the network device.

With reference to the fifth aspect, in some implementations of the fifth aspect, after the SRS transmission, the method further includes: switching a radio frequency chain from the eleventh carrier to the tenth carrier and/or the ninth carrier.

With reference to the fifth aspect, in some implementations of the fifth aspect, the method further includes: receiving first signaling from the network device at a second moment; and determining, based on the first signaling, a quantity of radio frequency chains of the ninth carrier and/or the tenth carrier after the SRS transmission on the eleventh carrier, where the second moment is before a first moment, the first moment is a start moment or an end moment of the first time unit of the SRS transmission on the eleventh carrier, or the first moment is a start moment or an end moment of the last time unit of the SRS transmission on the eleventh carrier, or the first moment is a start moment or an end moment of switching a radio frequency chain from the tenth carrier and/or the ninth carrier to the eleventh carrier, or the first moment is an end moment of the last time unit of the second time period or the third time period that is closest to the SRS transmission on the eleventh carrier, or the first moment is a start moment of the first time unit of the second time period or the third time period after the SRS transmission on the eleventh carrier.

With reference to the fifth aspect, in some implementations of the fifth aspect, the method further includes: rejecting an $(M+1)^{th}$ time of radio frequency chain switching in a fifth time period, where M is greater than or equal to 1, M is an integer, and the fifth time period is one or more time units.

With reference to the fifth aspect, in some implementations of the fifth aspect, the method further includes: receiving the first signaling from the network device at the second moment; and performing a first uplink transmission on the tenth carrier and/or the ninth carrier based on the first signaling, where the first uplink transmission is located after the SRS transmission on the eleventh carrier in time domain, and is adjacent to the SRS transmission on the eleventh carrier in time domain.

With reference to the fifth aspect, in some implementations of the fifth aspect, when the first signaling schedules a transmission on the ninth carrier, the method further includes: directly switching a radio frequency chain from the eleventh carrier to the ninth carrier.

With reference to the fifth aspect, in some implementations of the fifth aspect, when the first signaling schedules a transmission on the ninth carrier and the tenth carrier, the method further includes: directly switching a radio frequency chain from the eleventh carrier to the ninth carrier and the tenth carrier.

In other words, when SRS carrier switching and uplink radio frequency chain switching are configured for the terminal device, SRS carrier switching may be performed on the eleventh carrier and the tenth carrier, and uplink radio frequency chain switching may be performed on the ninth carrier and the tenth carrier.

With reference to the fifth aspect, in some implementations of the fifth aspect, the smallest time interval between the last time unit of the first signaling and the first time unit of the SRS transmission on the eleventh carrier is N2 plus switching duration, and the switching duration is switching duration of performing radio frequency chain switching on a band to which the ninth carrier belongs and a band to which the tenth carrier belongs, where N2 is an uplink transmission preparation time.

According to a sixth aspect, a communication method is provided. The method may be performed by a terminal device, or may be performed by a component (for example, a chip or a circuit) configured in the terminal device. The method includes: reporting a fourth carrier set and a fifth carrier set to a network device, where the fourth carrier set includes a twelfth carrier and a thirteenth carrier, the fifth carrier set includes the twelfth carrier and the thirteenth carrier, a first time period corresponding to the fourth carrier set is different from a first time period corresponding to the fifth carrier set, and the first time period is a time for adjusting a radio frequency chain during switching on the twelfth carrier and the thirteenth carrier; receiving fourth information from the network device, where the fourth information indicates the terminal device to perform radio frequency chain switching on the twelfth carrier and the thirteenth carrier; and determining, based on a sounding reference signal SRS and/or a physical uplink shared channel PUSCH parameter, a switching mode for switching on the twelfth carrier and the thirteenth carrier.

With reference to the sixth aspect, in some implementations of the sixth aspect, the determining, based on a sounding reference signal SRS and/or a physical uplink shared channel (PUSCH) parameter, a switching mode for switching on the twelfth carrier and the thirteenth carrier includes: determining, based on a maximum quantity of ports of SRS resources on the twelfth carrier and the thirteenth carrier, the switching mode for switching on the twelfth carrier and the thirteenth carrier.

With reference to the sixth aspect, in some implementations of the sixth aspect, the maximum quantity of ports of the SRS resources is a maximum quantity of ports of all periodic SRS resources, semi-persistent SRS resources, and aperiodic SRS resources that are configured by the network device, or the maximum quantity of ports of the SRS resources is a maximum quantity of ports of all periodic SRS resources, active semi-persistent SRS resources, and aperiodic SRS resources that are configured by the network device.

With reference to the sixth aspect, in some implementations of the sixth aspect, the method further includes: determining a first time period corresponding to radio frequency chain switching on the twelfth carrier and the thirteenth carrier.

According to a seventh aspect, a communication method is provided. The method may be performed by a terminal device, or may be performed by a component (for example, a chip or a circuit) configured in the terminal device. The method includes: reporting a sixth carrier set to a network device, where the sixth carrier set includes a twelfth carrier and a thirteenth carrier, a maximum quantity of radio frequency chains supported on at least one carrier in the sixth carrier set has a plurality of different values, the sixth carrier set corresponds to at least one first time period, and the first time period is a time for adjusting a radio frequency chain during switching on the twelfth carrier and the thirteenth carrier; receiving fourth information from the network device, where the fourth information indicates the terminal device to perform radio frequency chain switching on the twelfth carrier and the thirteenth carrier; and determining, based on a sounding reference signal SRS and/or a physical uplink shared channel PUSCH parameter, a switching mode for switching on the twelfth carrier and the thirteenth carrier.

With reference to the seventh aspect, in some implementations of the seventh aspect, the determining, based on a sounding reference signal SRS and/or a physical uplink shared channel PUSCH parameter, a switching mode for switching on the twelfth carrier and the thirteenth carrier includes: determining, based on a maximum quantity of ports of SRS resources on the twelfth carrier and the thirteenth carrier, the switching mode for switching on the twelfth carrier and the thirteenth carrier.

With reference to the seventh aspect, in some implementations of the seventh aspect, the maximum quantity of ports of the SRS resources is a maximum quantity of ports of all periodic SRS resources, semi-persistent SRS resources, and aperiodic SRS resources that are configured by the network device, or the maximum quantity of ports of the SRS resources is a maximum quantity of ports of all periodic SRS resources, active semi-persistent SRS resources, and aperiodic SRS resources that are configured by the network device.

With reference to the seventh aspect, in some implementations of the seventh aspect, the method further includes: determining a first time period corresponding to radio frequency chain switching on the twelfth carrier and the thirteenth carrier.

According to an eighth aspect, a communication method is provided. The method may be performed by a network device, or may be performed by a component (for example, a chip or a circuit) configured in the network device. The method includes: performing an uplink transmission with a terminal device on a tenth carrier, where the tenth carrier is a carrier in a second carrier set; sending third information to the terminal device, where the third information indicates the terminal device to perform a sounding reference signal SRS transmission on an eleventh carrier; and determining not to perform an uplink transmission on the tenth carrier and a ninth carrier in a third time period, where the ninth carrier may be a carrier that is in the second carrier set and that can perform radio frequency chain switching with the tenth carrier, and the eleventh carrier is not a carrier in the second carrier set.

With reference to the eighth aspect, in some implementations of the eighth aspect, the third time period is a larger value in a second time period and a first time period, or the third time period is a sum of the second time period and the first time period, where the second time period is a time period in which a radio frequency chain is adjusted during switching on the tenth carrier and the eleventh carrier, and the first time period is a time period in which a radio frequency chain is adjusted during switching on the tenth carrier and the ninth carrier.

With reference to the eighth aspect, in some implementations of the eighth aspect, the method further includes: receiving the third time period reported by the terminal device.

With reference to the eighth aspect, in some implementations of the eighth aspect, the method further includes:

sending first signaling to the terminal device at a second moment, where the first signaling is used for determining a quantity of radio frequency chains of the ninth carrier and/or the tenth carrier after the SRS transmission on the eleventh carrier, where the second moment is before a first moment, the first moment is a start moment or an end moment of the first time unit of the SRS transmission on the eleventh carrier, or the first moment is a start moment or an end moment of switching a radio frequency chain from the tenth carrier and/or the ninth carrier to the eleventh carrier, or the first moment is an end moment of the last time unit of the second time period or the third time period that is closest to the SRS transmission on the eleventh carrier, or the first moment is a start moment of the first time unit of the second time period or the third time period after the SRS transmission on the eleventh carrier.

According to a ninth aspect, a communication apparatus is provided. The apparatus includes: a transceiver module, configured to: send first information to a network device, where the first information indicates whether a terminal device can simultaneously perform a transmission on different carriers in one carrier set through one radio frequency chain; and receive second information from the network device, where the second information indicates the terminal device to perform a first transmission on a first carrier, and the first carrier is a carrier in a first carrier set.

The transceiver module may perform the receiving and sending in the first aspect. The apparatus further includes a processing module. The processing module may perform other processing other than the receiving and sending in the first aspect.

According to a tenth aspect, a communication apparatus is provided. The apparatus includes: a transceiver module, configured to: receive first information from a terminal device, where the first information indicates whether the terminal device can simultaneously perform a transmission on different carriers in one carrier set through one radio frequency chain; and send second information to the terminal device, where the second information indicates the terminal device to perform a first transmission on a first carrier, and the first carrier is a carrier in a first carrier set.

The transceiver module may perform the receiving and sending in the second aspect. The apparatus further includes a processing module. The processing module may perform other processing other than the receiving and sending in the second aspect.

According to an eleventh aspect, a communication apparatus is provided. The apparatus includes: a transceiver module, configured to perform an uplink transmission with a network device on a tenth carrier, where the tenth carrier is a carrier in a second carrier set, where the transceiver module is further configured to receive third information from the network device, where the third information indicates the terminal device to perform a sounding reference signal SRS transmission on an eleventh carrier; and a processing module, configured to determine not to perform an uplink transmission on the tenth carrier and a ninth carrier in a third time period, where the ninth carrier may be a carrier that is in the second carrier set and that can perform radio frequency chain switching with the tenth carrier, and the eleventh carrier is not a carrier in the second carrier set.

The transceiver module may perform the receiving and sending in the fifth aspect. The apparatus further includes a processing module. The processing module may perform other processing other than the receiving and sending in the fifth aspect.

According to a twelfth aspect, a communication apparatus is provided. The apparatus includes: a transceiver module, configured to report a fourth carrier set and a fifth carrier set to a network device, where the fourth carrier set includes a twelfth carrier and a thirteenth carrier, the fifth carrier set includes the twelfth carrier and the thirteenth carrier, a first time period corresponding to the fourth carrier set is different from a first time period corresponding to the fifth carrier set, and the first time period is a time for adjusting a radio frequency chain during switching on the twelfth carrier and the thirteenth carrier, where the transceiver module is further configured to receive fourth information from the network device, where the fourth information indicates the terminal device to perform radio frequency chain switching on the twelfth carrier and the thirteenth carrier; and a processing module, configured to determine, based on a sounding reference signal SRS and/or a physical uplink shared channel PUSCH parameter, a switching mode for switching on the twelfth carrier and the thirteenth carrier.

The transceiver module may perform the receiving and sending in the sixth aspect. The apparatus further includes a processing module. The processing module may perform other processing other than the receiving and sending in the sixth aspect.

According to a thirteenth aspect, a communication apparatus is provided. The apparatus includes: a transceiver module, configured to report a sixth carrier set to a network device, where the sixth carrier set includes a twelfth carrier and a thirteenth carrier, a maximum quantity of radio frequency chains supported on at least one carrier in the sixth carrier set has a plurality of different values, the sixth carrier set corresponds to at least one first time period, and the first time period is a time for adjusting a radio frequency chain during switching on the twelfth carrier and the thirteenth carrier, where the transceiver module is further configured to receive fourth information from the network device, where the fourth information indicates the terminal device to perform radio frequency chain switching on the twelfth carrier and the thirteenth carrier; and a processing module, configured to determine, based on a sounding reference signal SRS and/or a physical uplink shared channel PUSCH parameter, a switching mode for switching on the twelfth carrier and the thirteenth carrier.

The transceiver module may perform the receiving and sending in the seventh aspect. The apparatus further includes a processing module. The processing module may perform other processing other than the receiving and sending in the seventh aspect.

According to a fourteenth aspect, a communication apparatus is provided. The apparatus includes: a transceiver module, configured to perform an uplink transmission with a terminal device on a tenth carrier, where the tenth carrier is a carrier in a second carrier set, where the transceiver module is further configured to send third information to the terminal device, where the third information indicates the terminal device to perform a sounding reference signal SRS transmission on an eleventh carrier; and a processing module, configured to determine not to perform an uplink transmission on the tenth carrier and a ninth carrier in a third time period, where the ninth carrier may be a carrier that is in the second carrier set and that can perform radio frequency chain switching with the tenth carrier, and the eleventh carrier is not a carrier in the second carrier set.

The transceiver module may perform the receiving and sending in the eighth aspect. The apparatus further includes a processing module. The processing module may perform other processing other than the receiving and sending in the eighth aspect.

According to a fifteenth aspect, a communication apparatus is provided. The apparatus includes: a processor, configured to execute a computer program stored in a memory, so that the communication apparatus performs any possible implementation of the first aspect or the second aspect.

According to a sixteenth aspect, a computer-readable storage medium is provided. The computer-readable storage medium stores a computer program. When the computer program runs on a computer, the computer is enabled to perform any possible implementation of the first aspect or the second aspect.

According to a seventeenth aspect, a computer program product is provided. The computer program product includes computer program instructions. When the computer program instructions run on a computer, the computer is enabled to perform any possible implementation of the first aspect or the second aspect.

According to an eighteenth aspect, a chip system is provided. The chip system includes: a processor, configured to invoke and run a computer program from a memory, so that a communication device on which the chip system is installed performs any possible implementation of the first aspect or the second aspect.

BRIEF DESCRIPTION OF DRAWINGS

FIG. 3 is a schematic diagram of transmission of an embodiment according to an embodiment of this application;

FIG. 4 is a schematic block diagram of an example of a communication apparatus according to this application;

FIG. 5 is a schematic block diagram of another example of a communication apparatus according to this application;

DESCRIPTION OF EMBODIMENTS

Figure 1:
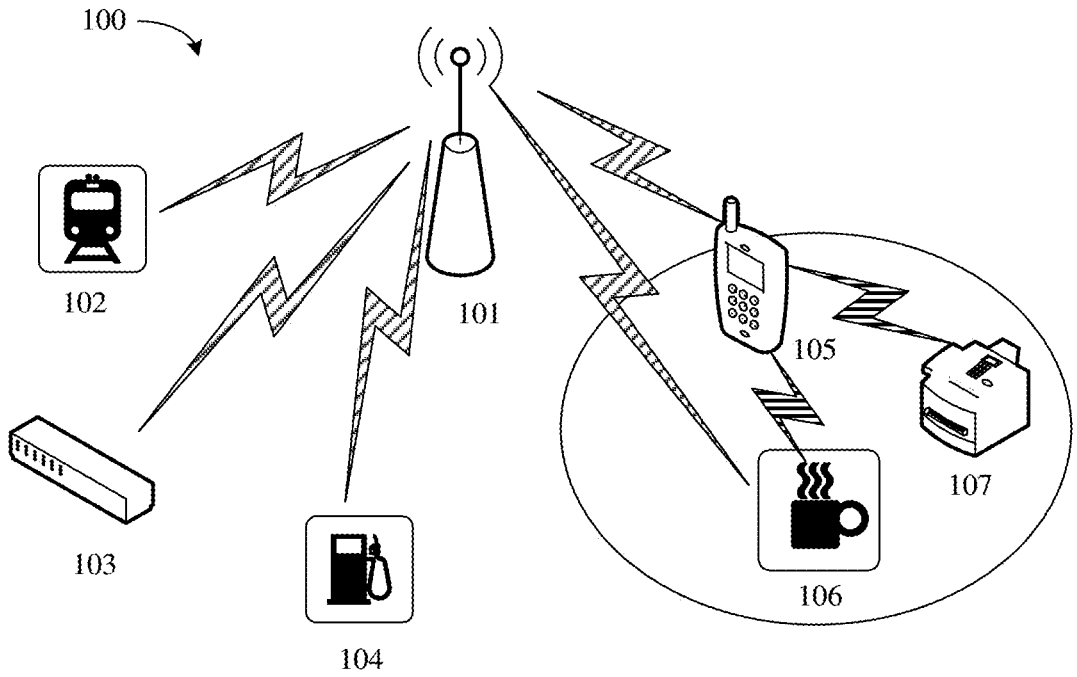
FIG. 1 is a schematic diagram of a communication system used in an embodiment of this application.

The following describes technical solutions of this application with reference to the accompanying drawings.

The technical solutions in embodiments of this application may be applied to various communication systems, for example, a long term evolution (LTE) system, an LTE frequency division duplex (FDD) system, LTE time division duplex (TDD), a universal mobile telecommunications system (UMTS), a worldwide interoperability for microwave access (WiMAX) communication system, a 5G mobile communication system, or a new radio access technology (NR). The 5G mobile communication system may include non-standalone (NSA) networking and/or standalone (SA).

The technical solutions provided in this application may be further applied to machine type communication (MTC), long term evolution-machine (LTE-M), a device-to-device (D2D) network, a machine-to-machine (M2M) network, an internet of things (IoT) network, or another network. The IoT network may include, for example, an internet of vehicles. Communication manners in an internet of vehicles system are collectively referred to as a vehicle to X device (vehicle to X, V2X, X can stand for anything). For example, the V2X may include: vehicle to vehicle (V2V) communication, vehicle to infrastructure (V2I) communication, vehicle to pedestrian communication (V2P), vehicle to network (V2N) communication, or the like.

The technical solutions provided in this application may be further applied to a future communication system, for example, a sixth generation mobile communication system. This is not limited in this application.

In embodiments of this application, a network device may be any device having the wireless transceiver function. The device includes, but is not limited to: an evolved NodeB (eNB), a radio network controller (RNC), a NodeB (NB), a base station controller (BSC), a base transceiver station (BTS), a home base station (for example, a home evolved NodeB, or home NodeB, HNB), a baseband unit (BBU), an access point (AP), a wireless relay node, a wireless backhaul node, a transmission point (TP), a transmission and reception point (TRP), or the like in a wireless fidelity (Wi-Fi) system, may be 5G, for example, NR, a gNB in a system, or a transmission point (TRP or TP), or one antenna panel or one group of antenna panels (including a plurality of antenna panels) of a base station in a 5G system, or may be a network node that forms a gNB or a transmission point, for example, a baseband unit (BBU), a distributed unit (DU), or the like.

In some deployments, the gNB may include a central unit (CU) and a DU. The gNB may further include an active antenna unit (AAU). The CU implements some functions of the gNB, and the DU implements some functions of the gNB. For example, the CU is responsible for processing a non-real-time protocol and a service, and implements functions of radio resource control (RRC) and a packet data convergence protocol (PDCP) layer. The DU is responsible for processing a physical layer protocol and a real-time service, and implementing functions of a radio link control (RLC) layer, a medium access control (MAC) layer, and a physical (PHY) layer. The AAU implements some physical layer processing functions, radio frequency processing, and functions related to active antennas. Because information of the RRC layer is finally changed into information of the PHY layer, or is changed from the information of the PHY layer, in this architecture, higher layer signaling such as RRC layer signaling may also be considered to be sent by the DU or sent by the DU and the AAU. It may be understood that the network device may be a device including one or more of a CU node, a DU node, and an AAU node. In addition, the CU may be classified into a network device in an access network (RAN), or the CU may be classified into a network device in a core network (CN). This is not limited in this application.

The network device provides a service for a cell, and a terminal device uses a transmission resource (for example, a frequency domain resource, or a spectrum resource) allocated by the network device. The cell may belong to a macro base station (for example, a macro eNB or a macro gNB), or may belong to a base station corresponding to a small cell. The small cell herein may include: a metro cell (a micro cell, a pico cell, a femto cell, and the like. These small cells have characteristics of small coverage and low transmitting power, and are applicable to providing a high-speed data transmission service.

In this embodiment of this application, the terminal device may also be referred to as user equipment (UE), an access terminal device, a subscriber unit, a subscriber station, a mobile station, a remote station, a remote terminal device, a mobile device, a user terminal device, a terminal device, a wireless communication device, a user agent, or a user apparatus.

The terminal device may be a device that provides voice/data connectivity for a user, for example, a handheld device or a vehicle-mounted device with a wireless connection function. Currently, examples of some terminal devices may be: a mobile phone, a tablet computer, a computer (for example, a notebook computer or a palmtop computer) with a wireless transceiver function, a mobile internet device (MID), a virtual reality (VR) device, an augmented reality (AR) device, a wireless terminal device in industrial control, a wireless terminal device in self-driving-, a wireless terminal device in remote medical, a wireless terminal device in a smart grid, a wireless terminal device in transportation safety, a wireless terminal device in a smart city, a wireless terminal device in a smart home, a cellular phone, a cordless phone, a session initiation protocol (SIP) phone, a wireless local loop (WLL) station, a personal digital assistant (PDA), a handheld device with a wireless communication function, a computing device or another processing device connected to a wireless modem, a vehicle-mounted device, a wearable device, a terminal device in a 5G network, a terminal device in a future evolved public land mobile network (PLMN), or the like.

The wearable device may also be referred to as a wearable intelligent device, and is a generic term for wearable devices such as glasses, gloves, watches, clothes, and shoes that are developed by applying wearable technologies to intelligent designs of daily wear. The wearable device is a portable device that is directly worn on the body or integrated into clothes or accessories of a user. The wearable device is not only a hardware device, but also implements powerful functions through software support, data interaction, and cloud interaction. In a broad sense, the wearable intelligent device includes a full-function large-size device that can complete or partial functions without relying on a smartphone, for example, a smartwatch or smart glasses, and a device that focuses only on a type of application function and needs to be used with other devices such as smartphones, for example, various smart bands and smart jewelry for physical sign monitoring.

In addition, the terminal device may alternatively be a terminal device in an internet of things (IoT) system. IoT is an important part of future information technology development. Its main technical feature is to connect articles to a network through communication technologies, to implement an intelligent network of man-machine interconnection and object interconnection. The IoT technology may use, for example, a narrowband (NB) technology to implement massive connections, in-depth coverage, and power saving of terminal devices.

In addition, the terminal device may alternatively include sensors such as an intelligent printer, a train detector, and a gas station, and main functions include: collecting data (which is a function of some terminal devices), receiving control information and downlink data of a network device, sending an electromagnetic wave, and transmitting uplink data to the network device.

For ease of understanding embodiments of this application, a communication system applicable to the methods provided in embodiments of this application is first described in detail with reference to FIG. 1. FIG. 1 is a schematic diagram of a communication system 100 used in a method according to an embodiment of this application. As shown in the figure, the communication system 100 may include at least one network device, for example, a network device 101 in a 5G system shown in FIG. 1. The communication system 100 may further include at least one terminal device, for example, terminal devices 102 to 107 shown in FIG. 1. The terminal devices 102 to 107 may be mobile or fixed. The network device 101 and one or more of the terminal devices 102 to 107 may communicate with each other through a radio link. Each network device may provide communication coverage for a specific geographical area, and may communicate with a terminal device located in an area of the coverage. For example, the network device may send configuration information to the terminal device. The terminal device may send uplink data to the network device based on the configuration information. In another example, the network device may send downlink data to the terminal device. Therefore, the network device 101 and the terminal devices 102 to 107 in FIG. 1 form a communication system.

Optionally, the terminal devices may communicate with each other directly. For example, direct communication between the terminal devices may be implemented by using a D2D technology or the like. As shown in the figure, the terminal devices 105 and 106 and the terminal devices 105 and 107 may directly communicate with each other by using a D2D technology. The terminal device 106 and the terminal device 107 may separately or simultaneously communicate with the terminal device 105.

Alternatively, the terminal devices 105 to 107 may separately communicate with the network device 101. For example, the terminal device 105 and the terminal device 106 in the figure may directly communicate with the network device 101. Alternatively, the terminal device 107 in the figure may communicate with the network device 101 indirectly, for example, communicate with the network device 101 via the terminal device 106.

It should be understood that FIG. 1 shows an example of one network device, a plurality of terminal devices, and a communication link between communication devices. Optionally, the communication system 100 may include a plurality of network devices, and a coverage area of each network device may include another quantity of terminal devices, for example, more or fewer terminal devices than those shown in FIG. 1. This is not limited in embodiments of this application.

A plurality of antennas may be configured for each of the foregoing communication devices, for example, the network device 101 and the terminal devices 102 to 107 in FIG. 1. The plurality of antennas may include at least one transmit antenna configured to transmit a signal and at least one receive antenna configured to receive a signal. In addition, each communication device further additionally includes a transmitter chain and a receiver chain. A person of ordinary skill in the art may understand that each of the transmitter chain and the receiver chain may include a plurality of components (for example, a processor, a modulator, a multiplexer, a demodulator, a demultiplexer, an antenna, and the like) related to signal transmission and reception. Therefore, the network device and the terminal device may communicate with each other by using a multi-antenna technology.

Optionally, the wireless communication system 100 may further include another network entity, for example, a network controller and a mobility management entity. This is not limited in embodiments of this application.

For ease of understanding of embodiments of this application, terms in embodiments of this application are briefly described below.

1. Carrier Aggregation (CA)

CA aggregates two or more component carriers (CC) to support a larger transmission bandwidth. If each CC corresponds to one independent cell, one CC may be equivalent to one cell. To efficiently utilize fragmented spectrums, carrier aggregation supports aggregation between different CCs. Carrier aggregation may include: intra-band or inter-band CC aggregation. For the intra-band CC aggregation, intra-band CC aggregation may be further classified into intra-band adjacent or non-adjacent CC aggregation, and the like.

2. Radio Frequency Chain (Tx)

Tx is a physical concept, and may also be referred to as a radio frequency (RF) transmit channel. For ease of description, Tx is referred to as a radio frequency chain for short in this application. In this application, the radio frequency chain may work in the following manners, but is not limited to the following manners: The radio frequency chain may receive a baseband signal from a baseband chip, perform radio frequency processing (for example, up-conversion, amplification, and filtering) on the baseband signal to obtain a radio frequency signal, and finally radiate the radio frequency signal into space through an antenna. Details are as follows: The radio frequency chain may include electronic devices such as an antenna switch, an antenna tuner, a low noise amplifier (LNA), a power amplifier (PA), a mixer, a local oscillator (LO), and a filter. These electronic devices may be integrated into one or more chips as required. Antennas can also sometimes be considered as part of the radio frequency chain. Optionally, in this application, the radio frequency chain may be replaced with a Tx, an antenna, a radio frequency, a transmit channel, a transmit port, a quantity of radio frequency chains, a quantity of transmission layers, a maximum quantity of layers of transmissions, a maximum quantity of layers supported by a transmission, a receive channel, or any combination thereof. Optionally, in this application, if the quantity of radio frequency chains of the UE on one carrier is X, it means that the UE supports an uplink transmission with a quantity of ports less than or equal to X on the carrier, and does not support an uplink transmission with a quantity of ports greater than X. It also means that an operating status of the UE (or a status of the UE) is that the carrier supports an uplink transmission with a quantity of ports less than or equal to X, and does not support an uplink transmission with a quantity of ports greater than X, where X is a positive integer.

3. Port

The port may include a transmit port and a receive port. The transmit port may be understood as a virtual antenna identified by a receiving device.

Optionally, the port may be a transmit antenna port. For example, a reference signal of each transmit antenna port may be a reference signal that is not precoded. The transmit antenna port may be an actual independent sending unit (TxRU).

Optionally, the port may be a port on which beamforming is performed. For example, the reference signal of each port may be a precoded reference signal obtained by precoding a reference signal based on an angle vector. It may be understood that if beamforming is performed on the reference signal, a quantity of ports may be a quantity of ports of the precoded reference signal. The quantity of ports of the precoded reference signal may be less than a quantity of transmit antenna ports.

Optionally, the port may be a port obtained by performing phase rotation. For example, the reference signal of each port may be a precoded reference signal that is precoded based on one delay vector and that is sent through one transmit antenna port. The port may also be referred to as a port of a precoded reference signal.

Optionally, the port may be a port on which beamforming and phase rotation are performed. For example, the reference signal of each port may be a precoded reference signal obtained by precoding a reference signal based on an angle vector and a delay vector. The port may also be referred to as a port of a precoded reference signal.

The reference signal of each port may be transmitted through one or more frequency domain units.

In the embodiments shown below, for a transmit antenna port, the quantity of ports may refer to a quantity of ports on which spatial domain precoding is not performed, for example, an actual quantity of independent sending units. For a port, in different embodiments, the port may be a transmit antenna port, or may be a port of a precoded reference signal. A specific meaning expressed by the port may be determined according to a specific embodiment. In the following, for ease of differentiation, the port of the precoded reference signal is referred to as a reference signal port.

The receive port may be understood as a receive antenna of the receiving device. For example, in a downlink transmission, the receive port may be a receive antenna of the terminal device.

4. Bandwidth

The bandwidth refers to a bandwidth occupied by a signal. When used to describe a channel, a bandwidth refers to a maximum bandwidth of a signal that can effectively pass through the channel. For an analog signal, a bandwidth, also known as a bandwidth, is measured in hertz (Hz). For example, a signal bandwidth of an analog voice phone is 3100 Hz (from 300 Hz to 3400 Hz), and a bandwidth of a PAL-D television channel is 8 MHz (including a guard bandwidth). For a digital signal, a bandwidth refers to an amount of data that can pass through a link per unit of time. For example, a bandwidth of a B channel of the ISDN is 64 Kbps. Because a digital signal is transmitted through modulation of an analog signal, a bandwidth of a digital channel is generally directly described by using a baud rate or a symbol rate to distinguish from an analog bandwidth.

5. Time Unit

In embodiments of this application, data and/or signaling may be carried through a time-frequency resource. The time-frequency resource may include a resource in time domain and a resource in frequency domain. The resource in time domain may include one or more time units (or may also be referred to as a time domain unit).

One time unit (which may also be referred to as a time domain unit) may be one symbol, one mini-slot, one slot, or one subframe. Duration of one subframe in time domain may be 1 millisecond (ms). One slot includes 7 or 14 symbols. One mini-slot may include at least one symbol (for example, 2 symbols or 7 symbols or 14 symbols, or any quantity of symbols less than or equal to 14).

To facilitate understanding of the communication method provided in this application, a solution in which UE having two radio frequency chains performs an uplink transmission on a band 1 and a band 2 is briefly described below with reference to Table 1. T represents a radio frequency chain Tx, and p represents a port. For example, in this embodiment, the band 1 includes one carrier, which is a carrier 1. The band 2 includes one carrier, which is a carrier 2.

TABLE 1

| | Quantity of radio frequency chains (a carrier 1 + a carrier 2) | Quantity of ports for an uplink transmission (a carrier 1 + a carrier 2) |
|---|---|---|
| State 1 | 1T + 1T | 1p + 0p, 1p + 1p, 0p + 1p |
| State 2 | 0T + 2T | 0p + 2p, 0p + 1p |

Table 1 defines two states in which UE having two radio frequency chains performs an uplink transmission on two carriers. It can be learned from Table 1 that, in the state 1, the UE has one radio frequency chain (1 T) on the carrier 1, and also has one radio frequency chain (1 T) on the carrier 2, which means that an operating status of the UE is that a 1-port uplink transmission is supported on the carrier 1, or an operating status of the UE is that a 1-port uplink transmission is supported on the carrier 2, or an operating status of the UE is that a 1-port uplink transmission is supported on the carrier 1 and at the same time a 1-port uplink transmission is supported on the carrier 2, or an operating status of the UE is that a 2-port uplink transmission is not supported on the carrier 1 and at the same time a 2-port uplink transmission is not supported on the carrier 2, or an operating status of the UE is that a 2-port uplink transmission is not supported on the carrier 1, or an operating status of the UE is that a 2-port uplink transmission is not supported on the carrier 2. In the state 2, the UE has no radio frequency chain (0 T) on the carrier 1, and has two radio frequency chains (2 T) on the carrier 2, which means that an operating status of the UE is that a 2-port or 1-port uplink transmission is supported on the carrier 2 and an uplink transmission is not supported on the carrier 1. That is, in the two states shown in Table 1, the UE supports at most one radio frequency chain on the carrier 1, and supports at most two radio frequency chains on the carrier 2. In a process of performing an uplink transmission, the UE may switch between two states, for example, one radio frequency chain is on the carrier 2, and the other radio frequency chain is switched between the carrier 1 and the carrier 2. It should be noted that switching duration is required for the UE to switch between the two states.

A base station may indirectly indicate, by indicating the quantity of ports for an uplink transmission to the UE, the UE to switch between the state 1 and the state 2. Details are as follows: In Table 1, there is a mapping relationship between the quantity of radio frequency chains and the quantity of ports for an uplink transmission. For example, in the state 1, the UE may have a 1-port uplink transmission (1 p) on the carrier 1 and no uplink transmission (0 p) on the carrier 2. Alternatively, the UE has a 1-port uplink transmission (1 p) on the carrier 1, and also has a 1-port uplink transmission (1 p) on the carrier 2. Alternatively, the UE has no uplink transmission (0 p) on the carrier 1, and has a 1-port uplink transmission (1 p) on the carrier 2. When the quantity of ports indicated by the base station to the UE meets the foregoing combination, the UE switches to the state 1, for example, the UE allocates one radio frequency chain on the carrier 1, and also allocates one radio frequency chain on the carrier 2. In another example, in the state 2, the UE has no uplink transmission (0 p) on the carrier 1, and has a 2-port uplink transmission (2 p) on the carrier 2. Alternatively, the UE has no uplink transmission (0 p) on the carrier 1, and has a 1-port uplink transmission (1 p) on the carrier 2. When the quantity of ports indicated by the base station to the UE meets the foregoing combination, the UE switches to the state 2, for example, the UE allocates no radio frequency chain on the carrier 1, and allocates two radio frequency chains on the carrier 2. It should be noted that the base station or the UE may determine, based on a port status of the UE during a previous uplink transmission, a port status of an uplink transmission to be performed, and a port status of an uplink transmission supported by the UE, whether switching duration is required. The quantity of ports for an uplink transmission supported by the UE on one carrier is less than or equal to the quantity of radio frequency chains of the UE on the carrier. For example, if the UE has X radio frequency chains on one carrier, the UE supports an uplink transmission with X or fewer ports on the carrier, and does not support an uplink transmission with more than X ports. For example, when the UE has one radio frequency chain on the carrier 1, the UE supports a 1-port transmission but does not support a 2-port transmission on the carrier 1. When the UE has two radio frequency chains on the carrier 2, the UE supports a 2-port or 1-port transmission on the carrier 2.

Switching duration is required for the UE to switch between the several states shown in Table 1. When an uplink transmission is changed in each state, radio frequency chain switching does not need to be performed, and no switching duration is required. For example, if an uplink transmission to be sent is an uplink transmission supported by a current state of the UE, or an uplink transmission supported by a current operating status of the UE, the UE does not need to perform state switching, does not need to perform radio frequency chain switching, and does not require switching duration.

However, in the solution shown in Table 1, only a case in which the UE performs an uplink transmission on two bands is considered, and each of the two bands has only one carrier. Therefore, it is expected to provide a solution applicable to more scenarios.

Figure 2:
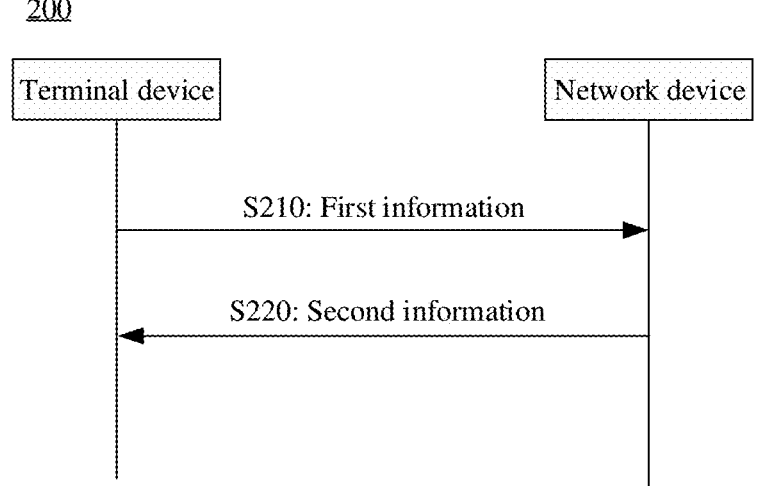
FIG. 2 is a schematic flowchart of a communication method according to an embodiment of this application.

FIG. 2 is a schematic flowchart of a method 200 according to an embodiment of this application. It can be seen from FIG. 2 that the method 200 includes the following steps.

S210: A terminal device sends first information to a network device, and correspondingly, the network device receives the first information from the terminal device, where the first information indicates whether the terminal device can simultaneously perform a transmission on different carriers in one carrier set through one radio frequency chain.

For example, the first information may be capability information of the terminal device. The capability information may indicate whether the terminal device can simultaneously perform a transmission on different carriers in one carrier set through one radio frequency chain. In other words, the capability information indicates whether switching duration is required when the terminal device performs radio frequency chain switching on different carriers in one carrier set. In other words, the capability information indicates whether the terminal device needs to perform switch a radio frequency chain on different carriers in one carrier set.

In a possible implementation, the first information indicates that the terminal device cannot simultaneously perform a transmission on different carriers in one carrier set through one radio frequency chain, or the first information indicates that switching duration is required when the terminal device performs radio frequency chain switching on different carriers in one carrier set, or the first information indicates that the terminal device needs to switch a radio frequency chain on different carriers in one carrier set.

In another possible implementation, the first information indicates that the terminal device can simultaneously perform a transmission on different carriers in one carrier set through one radio frequency chain, or the first information indicates that no switching duration is required when the terminal device performs radio frequency chain switching on different carriers in one carrier set, or the first information indicates that the terminal device does not need to switch a radio frequency chain on different carriers in one carrier set.

The network device receives the first information from the terminal device. Based on the first information, the network device determines whether the terminal device can simultaneously perform an uplink transmission on different carriers in one carrier set through one radio frequency chain, or the network device determines whether switching duration is required when the terminal device performs radio frequency chain switching on different carriers in one carrier set, or the network device determines whether the terminal device needs to switch a radio frequency chain on different carriers in one carrier set. When the terminal device can simultaneously perform a transmission on different carriers in one carrier set through one radio frequency chain, no switching duration is required when the terminal device switches one radio frequency chain on different carriers in one carrier set. In other words, if one radio frequency chain is on one carrier in the carrier set, it means that the radio frequency chain is also on all carriers in the carrier set, or a quantity of radio frequencies of the terminal device on one carrier in the carrier set is X. In this case, a quantity of radio frequencies on all carriers in the carrier set is also X, or radio frequency chain switching does not need to be performed on different carriers in the carrier set. When the terminal device cannot simultaneously perform a transmission on different carriers in one carrier set through one radio frequency chain, switching duration is required when the terminal device switches one radio frequency chain on different carriers in one carrier set.

It should be understood that the terminal device may report the first information to the network device when registering with and accessing a network, or may send the first information to the network device when there is an uplink transmission requirement. This is not limited in this application.

It should be further understood that the carrier set may be a set of carriers having a same feature. For example, one carrier set may be a set of all carriers belonging to a band. In another example, one carrier set may be a set of all carriers in a plurality of bands. When a plurality of bands are close in frequency domain and/or bandwidths of the plurality of bands are small, one carrier set may be a set of all carriers in the plurality of bands.

In still another possible implementation, the terminal device may not send the first information to the network device. A base station and the terminal device are preconfigured. When the terminal device does not send the first information to the network device, it indicates that the terminal device can simultaneously perform a transmission on different carriers in one carrier set through one radio frequency chain, or it indicates that no switching duration is required when the terminal device performs radio frequency chain switching on different carriers in one carrier set, or it indicates that the terminal device does not need to switch a radio frequency chain on different carriers in one carrier set. Alternatively, when the terminal device does not send the first information to the network device, it indicates that the terminal device cannot simultaneously perform a transmission on different carriers in one carrier set through one radio frequency chain, or it indicates that switching duration is required when the terminal device performs radio frequency chain switching on different carriers in one carrier set, or it indicates that the terminal device needs to switch a radio frequency chain on different carriers in one carrier set.

S220: The network device sends second information to the terminal device, and correspondingly, the terminal device receives the second information from the network device. The second information indicates the terminal device to perform an uplink transmission on a first carrier, and the first carrier is a carrier in a first carrier set.

For example, the network device indicates, by using the second information, the terminal device to perform an uplink transmission on one carrier in the first carrier set. The second information may be carried in radio resource control RRC signaling, or the second information may be carried in downlink control information DCI. Optionally, the first carrier set includes at least two carriers on one band. In some embodiments, the first carrier set may be, for example, a set of a plurality of carriers belonging to a first band, and the first carrier is one carrier in the plurality of carriers on the first band.

It should be understood that the network device and the terminal device may be set in a preconfiguration manner to perform an uplink transmission by using the first carrier, or it may be determined in the first carrier set by using a specific condition to perform an uplink transmission on the first carrier. This is not limited in this application.

In an example, a frequency of the first carrier is less than a frequency of a third carrier, and the third carrier is any carrier in the first carrier set. In some embodiments, the first carrier may be a carrier with the smallest frequency in the first carrier set. The terminal device is indicated to perform an uplink transmission on a carrier with the lowest frequency in the first carrier set, which helps reduce a path loss and improve cell coverage.

In another example, a bandwidth of the first carrier is greater than a bandwidth of a third carrier, and the third carrier is any carrier in the first carrier set. In some embodiments, the first carrier may be a carrier with the largest bandwidth in the first carrier set. The terminal device is indicated to perform an uplink transmission on a carrier with the largest bandwidth in the first carrier set, which helps fully use spectrum resources.

In still another example, the network device may flexibly configure or schedule, based on a load status and carrier information by using RRC signaling or DCI, a carrier that is in the first carrier set and that performs an uplink transmission. For example, the network device sends fourth information to the terminal device. The fourth information is carried in RRC signaling or DCI. The fourth information indicates to the terminal device that the network device expects to schedule the first carrier to perform an uplink transmission. It should be understood that this example may be combined with the foregoing two examples. In some embodiments, the network device indicates, to the terminal device by using the fourth information, that the network device expects to schedule a first carrier to perform an uplink transmission. The first carrier is a carrier with the lowest frequency and/or a carrier with the largest bandwidth in the first carrier set.

In still another example, when the terminal device and the network device perform a third transmission on the fourth carrier, the third transmission is one transmission that precedes the first transmission and that is closest to the first transmission in time domain order, and the fourth carrier does not belong to the first carrier set. In addition, when the terminal device and the network device perform a fourth transmission on a fifth carrier, the fourth transmission is one transmission that precedes the third transmission and that is at a time domain location closest to the third transmission, and the fifth carrier is a carrier in the first carrier set, the network device indicates that the first carrier on which the terminal device performs the first transmission is a carrier different from the fifth carrier. In some embodiments, the network device and the terminal device respectively continuously perform the "fourth transmission", the "third transmission", and the "first transmission" on the "fifth carrier", the "fourth carrier", and the "first carrier". The fifth carrier and the first carrier belong to the first carrier set, and the fourth carrier does not belong to the first carrier set. The first carrier is different from the fifth carrier. In this solution, spectrum resources of different carriers in the first carrier set can be fully utilized.

In still another example, when the terminal device and the network device perform a fifth transmission on a sixth carrier, the fifth transmission is one transmission that precedes the first transmission and that is at a time domain location closest to the first transmission, and the sixth carrier belongs to the first carrier set. The network device indicates that the first carrier on which the terminal device performs the first transmission is a carrier the same as the sixth carrier. In other words, the network device and the terminal device respectively continuously perform the "fifth transmission" and the "first transmission" on the "sixth carrier" and the "first carrier". The sixth carrier and the first carrier both belong to the first carrier set, and the first carrier is the same as the sixth carrier. Through this solution, a case in which the UE switches a radio frequency chain can be avoided, so that a delay can be reduced and transmission efficiency can be improved.

The foregoing solution is described below as an example with reference to Table 2. In the solution shown in Table 2, an uplink transmission between the UE and the base station is used as an example for description. Table 2 shows a possible solution in which UE having two radio frequency chains performs an uplink transmission on two bands (a band A and a band B). In this embodiment, the band A includes one carrier, namely, a carrier Z. The band B includes two carriers, namely, a carrier X and a carrier Y.

TABLE 2

|  | Quantity of radio frequency chains (a band A + a band B) |
| --- | --- |
| State 1 | 1T + 1T |
| State 2 | 0T + 2T |
| State 3 | 2T + 0T |

In the solution shown in Table 2, manners of performing an uplink transmission by the UE on the band A and the band B are classified into three states, for example, a state 1, a state 2, and a state 3. It can be learned from Table 2 that, in the state 1, the UE has one radio frequency chain (1 T) on the band A, and also has one radio frequency chain (1 T) on the band B. In the state 2, the UE has no radio frequency chain (0 T) on the band A, and has two radio frequency chains (2 T) on the band B. In the state 3, the UE has two radio frequency chains on the band A, and has no radio frequency chain on the band B. It should be noted that the three states shown in Table 2 may be separately implemented, or may be implemented in any combination. This is not limited in this application.

When the base station indicates the UE to perform an uplink transmission in the state 1, the UE performs an uplink transmission on the band B through one radio frequency chain. However, in this case, the band B includes two carriers. In a case in which the UE cannot simultaneously perform an uplink transmission on different carriers of one carrier set through one radio frequency chain, the UE cannot simultaneously perform a transmission on two carriers of the band B through one radio frequency chain.

In an example, before the base station indicates the UE to switch to the state 1, or when the base station indicates the UE to switch to the state 1, the base station schedules a carrier with a larger bandwidth in the carrier X and the carrier Y for the UE. It should be noted that the base station may indicate, to the UE by indicating a quantity of ports for an uplink transmission, a state in which the UE performs an uplink transmission. For a specific solution, refer to the solution in Table 1. Details are not described herein again. For example, if the base station determines that a bandwidth of the carrier X is greater than a bandwidth of the carrier Y, the base station schedules the carrier X for the UE. Alternatively, the base station schedules the carrier X for the UE based on preconfigured information. A bandwidth of the carrier X is greater than a bandwidth of the carrier Y. Based on an indication of the base station, the UE allocates one radio frequency chain to a carrier Z on the band A, and allocates another radio frequency chain to a carrier X on the band B. Therefore, according to the communication method provided in this embodiment, a carrier with a large bandwidth in the band B is scheduled for the UE, so that the UE can allocate one radio frequency chain to the carrier with a large bandwidth, which helps fully use spectrum resources.

In an example, before the base station indicates the UE to switch to the state 1, or when the base station indicates the UE to switch to the state 1, the base station schedules a carrier with a lower frequency in the carrier X and the carrier Y to the UE. For example, if the base station determines that a frequency of the carrier Y is less than a frequency of the carrier X, the base station schedules the carrier Y for the UE. Alternatively, the base station schedules the carrier Y for the UE based on preconfigured information. A frequency of the carrier Y is lower than a frequency of the carrier X. Based on an indication of the base station, the UE allocates one radio frequency chain to a carrier Z on the band A, and allocates another radio frequency chain to a carrier Y on the band B. Therefore, according to the communication method provided in this embodiment, a carrier with a low frequency in the band B is scheduled for the UE, so that the UE can allocate one radio frequency chain to the carrier with a low frequency, which helps improve cell coverage.

In still another example, when the base station indicates the UE to continuously perform an uplink transmission by using the "state 1", the "state 2", and the "state 1", carriers that are on the band B and that are scheduled by the base station for the UE before and after the state 2 are different. Alternatively, when the base station indicates the UE to continuously perform an uplink transmission by using the "state 1", the "state 3", and the "state 1", carriers that are on the band B and that are scheduled by the base station for the UE before and after the state 3 are different. Alternatively, when the base station indicates the UE to continuously perform an uplink transmission by using the "state 1", the "state 2", the "state 3", and the "state 1", carriers that are on the band B and that are scheduled by the base station for the UE before the state 2 and after the state 3 are different. In some embodiments, when the base station discontinuously indicates the UE to perform an uplink transmission in the state 1 a plurality of times, the base station alternately schedules different carriers on the band B for the UE. For example, when the base station indicates the UE to continuously perform an uplink transmission by using the "state 1", the "state 2", and the "state 1", in the state 1 before the state 2, the base station schedules the carrier X for the UE, and in the state 1 after the state 2, the base station schedules the carrier Y for the UE. It should be noted that when the UE switches from the state 1 to the state 2, the UE needs to switch one carrier of one radio frequency chain on the band A to one carrier on the band B. Similarly, when switching from the mode 2 to the state 1, the UE needs to switch one carrier of one radio frequency chain on the band B to one carrier on the band A. Therefore, when the base station indicates the UE to continuously perform an uplink transmission by using the "state 1", the "state 2", and the "state 1", the UE definitely needs to perform radio frequency chain switching. Therefore, through the method in this embodiment, before and after the state 2, the UE is indicated to perform an uplink transmission on different carriers of the band B, so that spectrum resources on the band B can be fully utilized.

In still another example, when the base station indicates the UE to perform an uplink transmission by using the "state 1" two consecutive times, the base station indicates the UE to perform an uplink transmission on a same carrier on the band B. For example, if the base station consecutively indicates the UE twice to perform an uplink transmission in the state 1 and the base station schedules the carrier X for the UE during the first indication, the base station still schedules the carrier X for the UE during the second indication. It should be understood that, when indicating the UE for the first time to perform a data transmission in the state 1, the base station may determine, by using any solution provided in embodiments of this application, a carrier to be scheduled for the UE. For example, the base station may schedule a carrier with a large bandwidth for the UE. This is not limited in this application. Therefore, according to the communication method provided in embodiments of this application, for a plurality of consecutive uplink transmissions performed in the state 1, a radio frequency chain is allocated to a same carrier on the band B, so that a case in which the UE switches a radio frequency chain can be avoided, to improve transmission efficiency.

Optionally, when the UE does not support a concurrency on the band A and the band B, the UE sends indication information to the base station to indicate that the UE does not support a concurrency on the band A and the band B, or to indicate that the UE does not support the state 1. After receiving the indication information sent by the UE, the base station no longer indicates the UE to perform an uplink transmission in the state 1. Therefore, according to the communication method provided in embodiments of this application, when the UE does not support a concurrency on the band A and the band B, it can be avoided that the UE is indicated to perform a data transmission in the state 1, to reduce transmission failures.

In the embodiment shown in Table 2, when the base station indicates the UE to switch to the state 2, the UE performs a data transmission on the band B by using two radio frequency chains. How to perform an uplink transmission on two carriers of the band B by using two radio frequency chains of the UE needs to be considered.

In a possible implementation, the UE uses the two radio frequency chains as a whole to perform an uplink transmission on one carrier on the band B. In an example, before the base station indicates the UE to switch to the state 2, or when the base station indicates the UE to switch to the state 2, the base station schedules a carrier with a larger bandwidth in the carrier X and the carrier Y for the UE. For example, if the base station determines that a bandwidth of the carrier X is greater than a bandwidth of the carrier Y, the base station schedules the carrier X for the UE. Alternatively, the base station schedules the carrier X for the UE based on preconfigured information. A bandwidth of the carrier X is greater than a bandwidth of the carrier Y. Based on an indication of the base station, the UE allocates the two radio frequency chains to the carrier X on the band B for an uplink transmission. Through this solution, spectrum resources can be effectively used.

It should be understood that the solution of performing a data transmission on two carriers of the band B by using one radio frequency chain provided in the foregoing embodiment may be applied to this possible implementation. For example, the base station may schedule, for the UE, a carrier with a low frequency on the band B. For brevity, details are not described herein again in this application.

In another possible implementation, the UE separately allocates the two radio frequency chains to two carriers on the band B. In an example, the base station schedules the carrier X and the carrier Y for the UE, and indicates the UE to switch to the state 2. The UE separately allocates the two radio frequency chains to the carrier X and the carrier Y based on the indication of the base station and the carrier scheduled by the base station. For example, the UE allocates one radio frequency chain to the carrier X, and allocates one radio frequency chain to the carrier Y.

Optionally, when configuring a carrier for the UE, the base station may configure an identifier for the carrier.

In a possible implementation, a same identifier is allocated to different carriers in the first carrier set. For example, in the embodiment shown in Table 2, the base station configures an identifier of a carrier on the band A to a "carrier 1", and configures identifiers of two carriers on the band B to a "carrier 2". In still another example, the base station may configure identifiers for the two carriers on the band B in a form of a carrier group. For example, the base station configures an identifier of a carrier on the band A to a "carrier 1", and configures identifiers of two carriers on the band B to a "carrier group 2". Alternatively, the base station configures an identifier of a carrier on the band A to a "carrier group 1", and configures identifiers of two carriers on the band B to a "carrier group 2". In yet another example, the base station may configure identifiers for the two carriers on the band B in a form of a band. For example, the base station configures an identifier of a carrier on the band A to a "band 1", and configures identifiers of two carriers on the band B to a "band 2". Alternatively, the base station configures an identifier of a carrier on the band A to a "band A", and configures identifiers of two carriers on the band B to a "band B". It should be understood that when one band includes three or more carriers, identifiers may still be configured for different carriers in the manner in this example. For example, when there is one carrier on the band A and there are three carriers on the band B, the base station configures an identifier of the carrier on the band A to the "carrier 1", and configures identifiers of the three carriers on the band B to the "carrier 2". Alternatively, the base station may configure identifiers for carriers on the band A and the band B in a form of a group or a form of a band. Details are not described herein again. It should be further understood that, when the first carrier set is a set of all carriers on a plurality of bands, an identifier may still be configured for a carrier in the first carrier set in the manner in this example. For example, the base station configures identifiers of all carriers in a plurality of bands in the first carrier set to the "carrier 1" or the "carrier group 1".

In another possible implementation, different identifiers are allocated to different carriers in the first carrier set. For example, in the embodiment shown in Table 2, the base station configures an identifier of a carrier on the band A to a "carrier 1", and configures identifiers of two carriers on the band B to a "carrier 2" and the "carrier 3" respectively. In still another example, the base station configures an identifier of a carrier on the band A to a "carrier Z", and configures identifiers of two carriers on the band B to the "carrier X" and the "carrier Y" respectively. It should be understood that when one band includes three or more carriers, identifiers may still be configured for different carriers in the manner in this example. For example, when there is one carrier on the band A and there are three carriers on the band B, the base station configures an identifier of the carrier on the band A to the "carrier 1", and configures identifiers of the three carriers on the band B to the "carrier 2", the "carrier 3", and the "carrier 4", respectively. It should be further understood that, when the first carrier set is a set of all carriers on a plurality of bands, different identifiers may still be configured for different carriers on different bands in the first carrier set in the manner in this example.

Optionally, the terminal device determines whether to perform an uplink transmission on the first carrier in the first time period. A start moment of the first time period is after an end moment of the second information, and an end moment of the first time period is a start moment of the first transmission.

It should be noted that when the terminal device cannot simultaneously perform a transmission on different carriers in one carrier set through one radio frequency chain, and the terminal device switches one radio frequency chain from one carrier in one carrier set to another carrier, switching duration is required, and the terminal device does not perform an uplink transmission in the switching duration, so that a case in which a transmission failure occurs when the terminal device performs switching between different carriers in one carrier set is avoided. The switching duration is a time required by the terminal device to switch a radio frequency chain between different carriers. In this application, that the switching duration is required means that a radio frequency chain switching needs to be performed in the first time period. In other words, an uplink transmission cannot be performed on a carrier on which a radio frequency chain is switched in the first time period. In other words, an uplink transmission cannot be performed in at least a carrier on which an uplink transmission is to be performed in the first time period.

In an example, when the terminal device cannot simultaneously perform an uplink transmission on different carriers in one carrier set through one radio frequency chain, the terminal device determines, based on a quantity of ports for the second transmission and a quantity of ports for the first transmission, whether to perform an uplink transmission on the first carrier in the first time period. The second transmission is a transmission that precedes the first transmission and that is closest to the first transmission in time domain order, for example, the second transmission is a previous transmission of the first transmission. An example in which the terminal device has two radio frequency chains is used for description. When the second transmission is a 1-port transmission on the second carrier, an operating status of UE is that a 2-port transmission is not supported on the second carrier, and the first transmission is a 1-port transmission on the first carrier, the terminal device determines not to perform an uplink transmission on at least the first carrier and the second carrier in the first time period, where the first carrier and the second carrier are different carriers in the first carrier set (for example, in the solution shown in Table 4, from a state 1-1 to a state 1-2, or from a state 1-2 to a state 1-1. In this case, the first carrier set includes a carrier X and a carrier Y). When the second transmission is a 2-port transmission on the second carrier, or the second transmission is a 1-port transmission on the second carrier and an operating status of UE is that a 2-port transmission is supported on the second carrier, and the first transmission is a 1-port or 2-port transmission on the first carrier, the terminal device determines not to perform an uplink transmission on at least the first carrier and the second carrier in the first time period, where the first carrier and the second carrier are different carriers in the first carrier set (for example, in the solution shown in Table 4, from a state 2-1 to a state 2-2, or from a state 2-2 to a state 2-1. In this case, the first carrier set includes a carrier X and a carrier Y). When the second transmission is only a 2-port transmission on the first carrier, and the first transmission is also only a 2-port transmission on the first carrier, in this case, the terminal device does not need to perform radio frequency chain switching, and the terminal device determines that an uplink transmission may be performed on the first carrier in the first time period. In other words, there is no first time period between the first transmission and the second transmission. When the second transmission is a concurrency of two carriers in the first carrier set (for example, the second transmission is a 1-port transmission on the first carrier and at the same time a 1-port transmission on the second carrier, and the first carrier and the second carrier are different carriers in the first carrier set), or the second transmission is a 1-port transmission on the first carrier, an operating status of UE during the second transmission is that a 2-port transmission is not supported on the first carrier, and the first transmission is a 2-port transmission on the first carrier, the terminal device determines not to perform an uplink transmission on at least the first carrier in the first time period (for example, in the solution shown in Table 3, from a state 2-3 to a state 2-2 or from a state 2-3 to a state 2-1. In this case, the first carrier set includes a carrier X and a carrier Y). When the first transmission is a 1-port transmission on the first carrier, the second transmission is a 2-port transmission on the second carrier, or the second transmission is a 1-port transmission on the second carrier and an operating status of UE is that a 2-port transmission is supported on the second carrier, the terminal device determines not to perform an uplink transmission on at least the first carrier and the second carrier in the first time period, where the first carrier and the second carrier are different carriers in the first carrier set (for example, in the solution shown in Table 3, from a state 2-1 to a state 2-2, or from a state 2-1 to a state 2-3, or from a state 2-2 to a state 2-1, or from a state 2-2 to a state 2-3. In this case, the first carrier set includes a carrier X and a carrier Y). When the first transmission is a 2-port transmission on the first carrier, the second transmission is a 2-port transmission on the second carrier, or the second transmission is a 1-port transmission on the second carrier and an operating status of UE is that a 2-port transmission is supported on the second carrier, the terminal device determines not to perform an uplink transmission on at least the first carrier and the second carrier in the first time period, where the first carrier and the second carrier are different carriers in the first carrier set (for example, in the solution shown in Table 3, from a state 2-1 to a state 2-2, or from a state 2-2 to a state 2-1. In this case, the first carrier set includes a carrier X and a carrier Y).

In this application, if the UE does not perform an uplink transmission, a status of a radio frequency chain of the UE is a state in a previous uplink transmission, or a status of the UE is a state in a previous uplink transmission.

In an example, when the terminal device cannot simultaneously perform an uplink transmission on different carriers in one carrier set through one radio frequency chain, the terminal device determines, based on the quantity of radio frequency chains on the first carrier in the second transmission and the quantity of radio frequency chains on the first carrier in the first transmission, whether to perform an uplink transmission on the first carrier in the first time period. The second transmission is one transmission that precedes the first transmission and that is closest to the first transmission in time domain order. An example in which the terminal device has two radio frequency chains is used for description. When the first transmission is a transmission on the first carrier, the second transmission is a transmission on another carrier other than the first carrier in the first carrier set, there is a total of one radio frequency chain on all carriers in the first carrier set during the second transmission, there is also a total of one radio frequency chain on all the carriers in the first carrier set during the first transmission, or a quantity of radio frequency chains on all the carriers in the first carrier set does not change during the first transmission and the second transmission, or in other words, the UE performs a 1-port first transmission on only the first carrier in the first carrier set during the first transmission, and in this case, the terminal device performs radio frequency chain switching in the first time period, the terminal device determines not to perform an uplink transmission on at least the first carrier in the first time period. In this case, it may also be understood that a carrier on which the radio frequency chain is located in the second transmission is different from a carrier on which the radio frequency chain is located in the first transmission, and radio frequency chain switching needs to be performed between the two transmissions (for example, in the solution shown in Table 3, from a state 1-1 to a state 1-2 or from a state 1-2 to a state 1-1. In this case, the first carrier set includes a carrier X and a carrier Y). When both the first transmission and the second transmission are transmissions on the first carrier, there is a total of one radio frequency chain on all carriers in the first carrier set during the second transmission, there is also a total of one radio frequency chain on all the carriers in the first carrier set during the first transmission, or in other words, a quantity of radio frequency chains on all the carriers in the first carrier set does not change during the first transmission and the second transmission, or in other words, the UE performs a 1-port first transmission on only the first carrier in the first carrier set during the first transmission, and in this case, the terminal device does not need to perform radio frequency chain switching, the terminal device determines that an uplink transmission can be performed on the first carrier in the first time period, or that there is no first time period between the first transmission and the second transmission. When the first transmission is a concurrency of two carriers in the first carrier set (For example, the first transmission is a 1-port transmission on the first carrier and at the same time a 1-port transmission on the second carrier, and the first carrier and the second carrier are different carriers in the first carrier set.), the second transmission is a 2-port transmission on any carrier in the first carrier set, there are a total of two radio frequency chains on all carriers in the first carrier set during the second transmission (in other words, there are two radio frequency chains on a carrier on which the second transmission is located), there are also a total of two radio frequency chains on all the carriers in the first carrier set during the first transmission (in other words, there is one radio frequency chain on each of the first carrier and the second carrier 2), or in other words, a quantity of radio frequency chains on all the carriers in the first carrier set does not change during the first transmission and the second transmission, the terminal device determines not to perform an uplink transmission on at least the first carrier and the second carrier in the first time period. In this case, it may also be understood that two radio frequency chains are on one carrier in the first carrier set during the second transmission, two radio frequency chains are on two carriers in the first carrier set during the first transmission, and at least one radio frequency chain needs to be switched between the two transmissions (for example, in the solution shown in Table 3, from a state 2-1 to a state 2-3 or from a state 2-2 to a state 2-3. In this case, the first carrier set includes a carrier X and a carrier Y). When the first transmission is a 2-port transmission on any carrier in the first carrier set, there are a total of two radio frequency chains on all carriers in the first carrier set during the first transmission (in other words, there are two radio frequency chains on a carrier on which the first transmission is located), the second transmission is a concurrency of two carriers in the first carrier set (for example, the second transmission is a 1-port transmission on the first carrier and at the same time a 1-port transmission on the second carrier, and the first carrier and the second carrier are different carriers in the first carrier set), or the second transmission is a 1-port transmission on the first carrier and there is one radio frequency chain on the second carrier at the same time, or the second transmission is a 1-port transmission on the second carrier and there is one radio frequency chain on the first carrier at the same time, the first carrier and the second carrier are different carriers in the first carrier set, and a quantity of radio frequency chains on all the carriers in the first carrier set does not change during the first transmission and the second transmission, the terminal the first transmission is located, there are also two radio frequency chains on a carrier on which the second transmission is located, and the carriers on which the first transmission and the second transmission are located are different), the terminal device determines not to perform an uplink transmission on at least the first carrier and the second carrier in the first time period (for example, in the solution shown in Table 3, from a state 2-1 to a state 2-2, or from a state 2-2 to a state 2-1. In this case, the first carrier set includes a carrier X and a carrier Y). When the first transmission is a 1-port transmission on the first carrier, the second transmission is a 1-port or 2-port transmission on the second carrier, there is one radio frequency chain on the first carrier, there is also one radio frequency chain on the second carrier during the first transmission, there are two radio frequency chains on the second carrier during the second transmission, the first carrier and the second carrier are different carriers in the first carrier set, and there are always two radio frequency chains on all carriers in the first carrier set during the first transmission and the second transmission, the terminal device determines not to perform an uplink transmission on at least the first carrier and the second carrier in the first time period (for example, in the solution shown in Table 3, from a state 2-1 to a state 2-3, or from a state 2-2 to a state 2-3. In this case, the first carrier set includes a carrier X and a carrier Y).

The solution in this example is described below with reference to Table 3. In the solution shown in Table 3, an uplink transmission between the UE and the base station is used as an example for description. Table 3 shows a possible solution in which UE having two radio frequency chains performs an uplink transmission on two bands (a band A and a band B). In this embodiment, the band A includes one carrier, namely, a carrier Z. The band B includes two carriers, namely, a carrier X and a carrier Y.

TABLE 3

| | Quantity of radio frequency chains (a band A + a band B) | Quantity of radio frequency chains on the band B (a carrier X + a carrier Y) | Quantity of ports for an uplink transmission, the band A + the band B (the carrier X + the carrier Y) |
| --- | --- | --- | --- |
| State 1-1 | 1T + 1T (the carrier X) | 1T + 0T | 1p + (0p + 0p), 1p + (1p + 0p), 0p + (1p + 0p) |
| State 1-2 | 1T + 1T (the carrier Y) | 0T + 1T | 1p + (0p + 0p), 1p + (0p + 1p), 0p + (0p + 1p) |
| State 2-1 | 0T + 2T (the carrier X) | 2T + 0T | 0p + (2p + 0p), 0p + (1p + 0p) |
| State 2-2 | 0T + 2T (the carrier Y) | 0T + 2T | 0p + (0 + 2p), 0p + (0p + 1p) |
| State 2-3 | 0T + 2T (the carrier X + the carrier Y) | 1T + 1T | 0p + (1p + 1p), 0p + (0p + 1p), 0p + (1p + 0p) |
| State 3 | 2T + 0T | 0T + 0T | 1p + (0p + 0p), 2p + (0p + 0p) | device determines not to perform an uplink transmission on at least the first carrier and the second carrier in the first time period. In this case, it may also be understood that two radio frequency chains are on one carrier in the first carrier set during the second transmission, two radio frequency chains are on two carriers in the first carrier set during the first transmission, and at least one radio frequency chain needs to be switched between the two transmissions (for example, in the solution shown in Table 3, from a state 2-3 to a state 2-1 or from a state 2-3 to a state 2-2. In this case, the first carrier set includes a carrier X and a carrier Y). When the first transmission is a 1-port or 2-port transmission on the first carrier, the second transmission is a 1-port or 2-port transmission on another carrier other than the first carrier in the first carrier set, and there are always two radio frequency chains on all carriers in the first carrier set during the first transmission and the second transmission (in other words, there are two radio frequency chains on a carrier on which In the solution shown in Table 3, manners of performing an uplink transmission by the UE on the band A and the band B are classified into six states, in this example, a state 1-1, a state 1-2, a state 2-1, a state 2-2, a state 2-3, and a state 3. It can be learned from Table 3 that, in the state 1-1, the UE has one radio frequency chain (1 T) on the band A, and also has one radio frequency chain (1 T) on the band B, and one radio frequency chain on the band B is on the carrier X, which means that an operating status of the UE is that a 1-port uplink transmission is supported on the carrier X, or an operating status of the UE is that a 1-port uplink transmission is supported on the carrier Z, or an operating status of the UE is that a 1-port uplink transmission is supported on the carrier X and at the same time a 1-port uplink transmission is supported on the carrier Z, or an operating status of the UE is that a 2-port uplink transmission is not supported on the carrier X and at the same time a 2-port uplink transmission is not supported on the carrier Z, or an operating status of the UE is that a 2-port uplink transmission is not supported on the carrier X, or an operating status of the UE is that a 2-port uplink transmission is not supported on the carrier Z. In the state 1-2, the UE has one radio frequency chain (1 T) on the band A, and also has one radio frequency chain (1 T) on the band B, and one radio frequency chain on the band B is on the carrier Y, which means that an operating status of the UE is that a 1-port uplink transmission is supported on the carrier Y, or an operating status of the UE is that a 1-port uplink transmission is supported on the carrier Z, or an operating status of the UE is that a 1-port uplink transmission is supported on the carrier Y and at the same time a 1-port uplink transmission is supported on the carrier Z, or an operating status of the UE is that a 2-port uplink transmission is not supported on the carrier Y and at the same time a 2-port uplink transmission is not supported on the carrier Z, or an operating status of the UE is that a 2-port uplink transmission is not supported on the carrier Y, or an operating status of the UE is that a 2-port uplink transmission is not supported on the carrier Z. In the state 2-1, the UE has no radio frequency chain (0 T) on the band A, and has two radio frequency chains (2 T) on the band B, and the two radio frequency chains on the band B are on the carrier X, which means that an operating status of the UE is that a 2-port or 1-port uplink transmission is supported on the carrier X. In the state 2-2, the UE has no radio frequency chain (0 T) on the band A, and has two radio frequency chains (2 T) on the band B, and the two radio frequency chains on the band B are on the carrier Y, which means that an operating status of the UE is that a 2-port or 1-port uplink transmission is supported on the carrier Y. In the state 2-3, the UE has no radio frequency chain (0 T) on the band A, and has two radio frequency chains (2 T) on the band B, and in the two radio frequency chains on the band B, one radio frequency chain is on the carrier X, and one radio frequency chain is on the carrier Y, which means that an operating status of the UE is that a 1-port uplink transmission is supported on the carrier X and at the same time a 1-port uplink transmission is supported on the carrier Y, or an operating status of the UE is that a 1-port uplink transmission is supported on the carrier X, or an operating status of the UE is that a 1-port uplink transmission is supported on the carrier Y, or an operating status of the UE is that a 2-port uplink transmission is not supported on the carrier X and at the same time a 2-port uplink transmission is not supported on the carrier Y, or an operating status of the UE is that a 2-port uplink transmission is not supported on the carrier X, or an operating status of the UE is that a 2-port uplink transmission is not supported on the carrier Y. In the state 3, there are two radio frequency chains (2 T) on the band A, and there is no radio frequency chain (0 T) on the band B, which means that an operating status of the UE is that a 2-port or 1-port uplink transmission is supported on the carrier Z. It should be noted that the six states shown in Table 3 may be separately implemented, or may be implemented in any combination. This is not limited in this application.

Switching duration is required for the UE to switch between the several states shown in Table 3. When an uplink transmission is changed in each state, radio frequency chain switching does not need to be performed, and no switching duration is required. For example, if an uplink transmission to be sent is an uplink transmission supported by a current state of the UE, or an uplink transmission supported by a current operating status of the UE, the UE does not need to switch a state, does not need to perform radio frequency chain switching, and does not require switching duration. For example, the UE is in the state 1-1 in Table 3. The UE has one radio frequency chain on the carrier X, and the first transmission to be performed is a 1-port transmission on the carrier X (the first carrier). The last uplink transmission before the first transmission is a 1-port transmission (the second transmission) on the carrier Z, and both the first transmission and the second transmission are transmissions in the state 1-1. In this case, the UE does not need to perform radio frequency chain switching. The UE determines that an uplink transmission can be performed on the carrier X and the carrier Z in the first time period, or that there is no first time period between the first transmission and the second transmission. In this application, that the switching duration is required means that radio frequency chain switching needs to be performed in the first time period. In other words, an uplink transmission cannot be performed on a carrier on which the radio frequency chain is switched in the first time period. In other words, an uplink transmission cannot be performed in at least a carrier on which an uplink transmission is to be performed in the first time period. Particularly, in a case in which the UE cannot simultaneously perform an uplink transmission on different carriers in one band through one radio frequency chain, switching duration is also required for the UE to switch between the state 1-1 and the state 1-2. Switching duration is also required for the UE to switch between the state 2-1, the state 2-2, and the state 2-3. For example, FIG. 3 shows a possible case in which the UE performs a concurrency on the band A and the band B. It can be learned from FIG. 3 that, in the first time unit, the UE performs a concurrency on the carrier Z on the band A and the carrier X on the band B. In the second time unit, the UE performs a concurrency on the carrier Z on the band A and the carrier Y on the band B. In the third time unit, the UE performs a concurrency on the carrier Z on the band A and the carrier X on the band B. It should be understood that when the UE performs a concurrency in three time units, switching duration is required between every two time units.

When the base station indicates the UE to perform a first transmission on the carrier X, the UE determines, based on the quantity of radio frequency chains on the carrier X in the second transmission and the quantity of radio frequency chains on the carrier X in the first transmission, whether to perform an uplink transmission on the carrier X in the first time period. The second transmission is one transmission that precedes the first transmission and that is closest to the first transmission in time domain order. The first time period is in a time period after the UE receives the indication information that is sent by the base station and that is used for indicating the UE to perform the first transmission on the carrier X and before the UE starts the first transmission. For example, in the solution shown in Table 3, when the first transmission is in the state 1-1, and the second transmission is in the state 1-2, the quantity of radio frequency chains on the carrier X in the first transmission is 1 T. A quantity of carriers X in the second transmission is 0 T. Therefore, the UE determines not to perform an uplink transmission on the carrier X and the carrier Y in the first time period. In another example, in the solution shown in Table 3, when the first transmission is in the state 2-1, and the second transmission is in the state 2-2, the quantity of radio frequency chains on the carrier X in the first transmission is 2 T. A quantity of carriers X in the second transmission is 0 T. Therefore, the UE determines not to perform an uplink transmission on the carrier X and the carrier Y in the first time period.

It should be understood that some UEs may support simultaneous uplink transmissions on two or more carriers in one carrier set, and some UEs in one carrier set can simultaneously perform an uplink transmission on only one carrier. For example, the UE that supports the solution shown in Table 3 supports simultaneous uplink transmissions on two carriers on the band B, and the UE that supports the solution shown in Table 4 does not support simultaneous uplink transmissions on two carriers on the band B. For a terminal device that does not support simultaneous uplink transmissions on two or more carriers in one carrier set, when the terminal device cannot simultaneously perform an uplink transmission on different carriers in one carrier set through one radio frequency chain, the terminal device may determine, based on the quantity of radio frequency chains on the first carrier in the second transmission and the quantity of radio frequency chains on the first carrier in the first transmission, whether to perform an uplink transmission on the first carrier in the first time period. The second transmission is one transmission that precedes the first transmission and that is closest to the first transmission in time domain order. An example in which the terminal device has two radio frequency chains is used for description. When the first transmission is a transmission on the first carrier, the second transmission is a transmission on another carrier other than the first carrier in the first carrier set, there is a total of one radio frequency chain on all carriers in the first carrier set during the second transmission, there is also a total of one radio frequency chain on all the carriers in the first carrier set during the first transmission, or a quantity of radio frequency chains on all the carriers in the first carrier set does not change during the first transmission and the second transmission, or in other words, and the UE performs a 1-port first transmission on only the first carrier in the first carrier set during the first transmission, the terminal device determines not to perform an uplink transmission on at least the first carrier in the first time period. In this case, it may also be understood that a carrier on which the radio frequency chain is located in the second transmission is different from a carrier on which the radio frequency chain is located in the first transmission, and radio frequency chain switching needs to be performed between the two transmissions (for example, in the solution shown in Table 4, from a state 1-1 to a state 1-2 or from a state 1-2 to a state 1-1. In this case, the first carrier set includes a carrier X and a carrier Y). When both the first transmission and the second transmission are transmissions on the first carrier, there is a total of one radio frequency chain on all carriers in the first that there is no first time period between the first transmission and the second transmission. When the first transmission is a transmission on the first carrier, the second transmission is a transmission on another carrier other than the first carrier in the first carrier set, there are a total of two radio frequency chain on all carriers in the first carrier set during the second transmission, there are also a total of two radio frequency chains on all the carriers in the first carrier set during the first transmission, or a quantity of radio frequency chains on all the carriers in the first carrier set does not change during the first transmission and the second transmission, or in other words, the UE performs a 1-port first transmission or a 2-port transmission on only the first carrier in the first carrier set during the first transmission, the terminal device determines not to perform an uplink transmission on at least the first carrier in the first time period (for example, in the solution shown in Table 4, from a state 2-1 to a state 2-2 or from a state 2-2 to a state 2-1. In this case, the first carrier set includes a carrier X and a carrier Y). When both the first transmission and the second transmission are transmissions on the first carrier, there is a total of one radio frequency chain on all carriers in the first carrier set during the second transmission, there are also a total of two radio frequency chains on all the carriers in the first carrier set during the first transmission, or in other words, a quantity of radio frequency chains on all the carriers in the first carrier set does not change during the first transmission and the second transmission, or in other words, the UE performs a 1-port or 2-port first transmission on only the first carrier in the first carrier set during the first transmission, and in this case, the terminal device does not need to perform radio frequency chain switching, the terminal device determines that an uplink transmission can be performed on the first carrier in the first time period, or that there is no first time period between the first transmission and the second transmission.

The solution in this example is described below with reference to Table 4. In the solution shown in Table 4, an uplink transmission between the UE and the base station is used as an example for description. Table 4 shows a possible solution in which UE having two radio frequency chains performs an uplink transmission on two bands (a band A and a band B). In this embodiment, the band A includes one carrier, namely, a carrier Z. The band B includes two carriers, namely, a carrier X and a carrier Y.

TABLE 4

|  | Quantity of radio frequency chains (a band A + a band B) | Quantity of radio frequency chains on the band B (a carrier X + a carrier Y) | Quantity of ports for an uplink transmission, the band A + the band B (the carrier X + the carrier Y) |
|---|---|---|---|
| State 1-1 | 1T + 1T (the carrier X) | 1T + 0T | 1p + (0p + 0p), 1p + (1p + 0p), 0p + (1p + 0p) |
| State 1-2 | 1T + 1T (the carrier Y) | 0T + 1T | 1p + (0p + 0p), 1p + (0p + 1p), 0p + (0p + 1p) |
| State 2-1 | 0T + 2T (the carrier X) | 2T + 0T | 0p + (2p + 0p), 0p + (1p + 0p) |
| State 2-2 | 0T + 2T (the carrier Y) | 0T + 2T | 0p + (0p + 2p), 0p + (0p + 1p) |
| State 3 | 2T + 0T | 0T + 0T | 1p + (0p + 0p), 2p + (0p + 0p) | carrier set during the second transmission, there is also a total of one radio frequency chain on all the carriers in the first carrier set during the first transmission, or in other words, a quantity of radio frequency chains on all the carriers in the first carrier set does not change during the first transmission and the second transmission, or in other words, the UE performs a 1-port first transmission on only the first carrier in the first carrier set during the first transmission, the terminal device determines that an uplink transmission can be performed on the first carrier in the first time period, or In the solution shown in Table 4, manners of performing an uplink transmission by the UE on the band A and the band B are classified into five states, in this example, a state 1-1, a state 1-2, a state 2-1, a state 2-2, and a state 3. It should be understood that the five modes are similar to the state 1-1, the state 1-2, the state 2-1, the state 2-2, and the state 3 in Table 3, and therefore are not described again. It should be noted that the five modes shown in Table 4 may be separately implemented, or may be implemented in any combination. This is not limited in this application.

Switching duration is required for the UE to switch between the several states shown in Table 4. When an uplink transmission is changed in each state, radio frequency chain switching does not need to be performed, and no switching duration is required. Particularly, in a case in which the UE cannot simultaneously perform an uplink transmission on different carriers in one band through one radio frequency chain, switching duration is also required for the UE to switch between the state 1-1 and the state 1-2. Switching duration is also required for the UE to switch between the state 2-1 and the state 2-2. When the base station indicates the UE to perform a first transmission on the carrier X, the UE determines, based on the quantity of radio frequency chains on the carrier X in the second transmission and the quantity of radio frequency chains on the carrier X in the first transmission, whether to perform an uplink transmission on the carrier X in the first time period. The second transmission is one transmission that precedes the first transmission and that is closest to the first transmission in time domain order. The first time period is in a time period supported by an uplink transmission of the terminal device on different carriers in one carrier set, or a maximum quantity of MIMO layers supported by an uplink transmission, to indicate a maximum quantity of radio frequency chains of the terminal device on different carriers in one carrier set. For example, the terminal device sends third information to the network device, where the third information indicates a maximum quantity of layers supported by an uplink transmission of the terminal device on different carriers in the first carrier set.

Table 5 and Table 6 show other possible solutions provided in embodiments of this application.

In the solution shown in Table 5, manners of performing an uplink transmission by the UE on the band A and the band B are classified into five states, in this example, a state 1-1, a state 1-2, a state 2-1, a state 2-2, and a state 2-3. It should be understood that, compared with the solution in Table 3, the solution shown in Table 5 lacks the state 3, and other solutions are similar. Therefore, description is not repeated.

TABLE 5

| | Quantity of radio frequency chains (a band A + a band B) | Quantity of radio frequency chains on the band B (a carrier X + a carrier Y) | Quantity of ports for an uplink transmission, the band A + the band B (the carrier X + the carrier Y) |
|---|---|---|---|
| State 1-1 | 1T + 1T (the carrier X) | 1T + 0T | 1p + (0p + 0p), 1p + (1p + 0p), 0p + (1p + 0p) |
| State 1-2 | 1T + 1T (the carrier Y) | 0T + 1T | 1p + (0p + 0p), 1p + (0p + 1p), 0p + (0 + 1p) |
| State 2-1 | 0T + 2T (the carrier X) | 2T + 0T | 0p + (2p + 0p), 0p + (1p + 0p) |
| State 2-2 | 0T + 2T (the carrier Y) | 0T + 2T | 0p + (0 + 2p), 0p + (0p + 1p) |
| State 2-3 | 0T + 2T (the carrier X + the carrier Y) | 1T + 1T | 0p + (1p + 1p) | after the UE receives the indication information that is sent by the base station and that is used for indicating the UE to perform the first transmission on the carrier X and before the UE starts the first transmission. For example, in the solution shown in Table 4, when the first transmission is in the state 1-1, and the second transmission is in the state 1-2, the quantity of radio frequency chains on the carrier X in the In the solution shown in Table 6, manners of performing an uplink transmission by the UE on the band A and the band B are classified into four states, in this example, a state 1-1, a state 1-2, a state 2-1, and a state 2-2. It should be understood that, compared with the solution in Table 4, the solution shown in Table 6 lacks the state 3, and other solutions are similar. Therefore, description is not repeated.

TABLE 6

| | Quantity of radio frequency chains (a band A + a band B) | Quantity of radio frequency chains on the band B (a carrier X + a carrier Y) | Quantity of ports for an uplink transmission, the band A + the band B (the carrier X + the carrier Y) |
|---|---|---|---|
| State 1-1 | 1T + 1T (the carrier X) | 1T + 0T | 1p + (0p + 0p), 1p + (1p + 0p), 0p + (1p + 0p) |
| State 1-2 | 1T + 1T (the carrier Y) | 0T + 1T | 1p + (0p + 0p), 1p + (0p + 1p), 0p + (0 + 1p) |
| State 2-1 | 0T + 2T (the carrier X) | 2T + 0T | 0p + (2p + 0p), 0p + (1p + 0p) |
| State 2-2 | 0T + 2T (the carrier Y) | 0T + 2T | 0p + (0p + 2p), 0p + (0p + 1p) | first transmission is 1 T. A quantity of carriers X in the second transmission is 0 T. Therefore, the UE determines not to perform an uplink transmission on the carrier X in the first time period. In another example, in the solution shown in Table 4, when the first transmission is in the state 2-1, and the second transmission is in the state 2-2, the quantity of radio frequency chains on the carrier X in the first transmission is 2 T. A quantity of carriers X in the second transmission is 0 T. Therefore, the UE determines not to perform an uplink transmission on the carrier X in the first time period.

It should be understood that the terminal device may report, to the network device, a maximum quantity of layers It should be understood that the foregoing embodiment is described by using only an example in which the UE has two radio frequency chains. However, this application is not limited thereto. For example, in the embodiment shown in Table 7, the UE has four radio frequency chains, and in Table 7, maximum quantities of layers supported by an uplink transmission of the UE on three carriers are all 4. In the solution shown in Table 7, manners of performing an uplink transmission by the UE on the band A and the band B are classified into five states, in this example, a state 1-1, a state 1-2, a state 2-1, a state 2-2, and a state 3. The band A has one carrier, namely, a carrier Z. The band B has two carriers, namely, a carrier X and a carrier Y. When the terminal device cannot simultaneously perform an uplink transmission on different carriers in one carrier set through one radio frequency chain, the terminal device may determine, based on the quantity of radio frequency chains on the first carrier in the second transmission and the quantity of radio frequency chains on the first carrier in the first transmission, whether to perform an uplink transmission on the first carrier in the first time period. The second transmission is one transmission that precedes the first transmission and that is closest to the first transmission in time domain order. For example, an example in which the terminal device has four radio frequency chains is used for description. When the first transmission is a transmission on the first carrier, the second transmission is a transmission on another carrier other than the first carrier in the first carrier set, there is a total of one radio frequency chain on all carriers in the first carrier set during the second transmission, there are also a total of two radio frequency chains on all the carriers in the first carrier set during the first transmission, or a quantity of radio frequency chains on all the carriers in the first carrier set does not change during the first transmission and the second transmission, the terminal device determines not to perform an uplink transmission on at least the first carrier in the first time period. In this case, it may also be understood that a carrier on which the radio frequency chain is located in the second transmission is different from a carrier on which the radio frequency chain is located in the first transmission, and radio frequency chain switching needs to be performed between the two transmissions (for example, in the solution shown in Table 7, from a state 1-1 to a state 1-2 or from a state 1-2 to a state 1-1. In this case, the first carrier set includes a carrier X and a carrier Y). It should be understood that the solution shown in Table 4 for determining, based on the quantity of radio frequency chains on the first carrier in the second transmission and the quantity of radio frequency chains on the first carrier in the first transmission, whether to perform an uplink transmission on the first carrier in the first time period is also applicable to the solution in Table 7. A difference lies only in different quantities of radio frequency chains. For brevity, the description is not repeated.

tities of layers supported by an uplink transmission of the UE on different carriers corresponding to solutions in different tables are different). For example, the UE may report that the maximum quantities of layers supported by an uplink transmission on the carrier X and the carrier Y in the first carrier set are both 2, and the UE indicates, through reporting, that the UE cannot perform an uplink transmission on different carriers in one band simultaneously through one radio frequency chain. In this case, the base station may determine that instead of the switching rule in Table 7, the switching rule in Table 3, 4, 5, or 6 is followed when the UE performs radio frequency chain switching.

In some scenarios, the base station may further configure the UE to perform SRS carrier switching. It is assumed that a seventh carrier and an eighth carrier are two carriers configured by the base station for the UE, and sounding reference signal (SRS) carrier switching is configured between the seventh carrier and the eighth carrier. In some embodiments, the UE may switch the radio frequency chain from the seventh carrier to the eighth carrier, so that the UE can transmit an SRS on the eighth carrier. A cell corresponding to the eighth carrier is not configured with a physical uplink shared channel (PUSCH). When an SRS transmission is performed on the eighth carrier, an uplink transmission on the seventh carrier may be interrupted, for example, the UE may temporarily interrupt the uplink transmission on the seventh carrier to allow the eighth carrier to transmit the SRS. The UE reports a second time period to the base station. The second time period is an uplink interruption time during radio frequency adjustment during switching between two carriers for SRS carrier switching or a time during radio frequency chain switching between two carriers for SRS carrier switching. The second time period may be zero, or may not be zero. In a possible case, when the UE switches the radio frequency chain from the seventh carrier to the eighth carrier, radio frequency adjustment needs to be performed in the second time period. Then, the UE sends an SRS on the eighth carrier, and then switches from the eighth carrier to the seventh carrier, and radio frequency chain

TABLE 7

| | Quantity of radio frequency chains (a band A + a band B) | Quantity of radio frequency chains on the band B (a carrier X + a carrier Y) | Quantity of ports for an uplink transmission, the band A + the band B (the carrier X + the carrier Y) |
|---|---|---|---|
| State 1-1 | 2T + 2T (the carrier X) | 2T + 0T | 0p + (1p + 0p), 0p + (2p + 0p), 1p + (0p + 0p), 1p + (1p + 0p), 1p + (2p + 0p), 2p + (0p + 0p), 2p + (1p + 0p), 2p + (2p + 0p) |
| State 1-2 | 2T + 2T (the carrier Y) | 0T + 2T | 0p + (0p + 1p), 0p + (0p + 2p), 1p + (0p + 0p), 1p + (0p + 1p), 1p + (0p + 2p), 2p + (0p + 0p), 2p + (0p + 1p), 2p + (0p + 2p) |
| State 2-1 | 0T + 4T (the carrier X) | 4T + 0T | 0p + (1p + 0p), 0p + (2p + 0p), 0p + (4p + 0p) |
| State 2-2 | 0T + 4T (the carrier Y) | 0T + 4T | 0p + (0p + 1p), 0p + (0p + 2p), 0p + (0p + 4p) |
| State 3 | 4T + 0T | 0T + 0T | 1p + (0p + 0p), 2p + (0p + 0p), 4p + (0p + 0p) |

In Table 3 and Table 4, maximum quantities of layers supported by an uplink transmission of the UE on the three carriers are all 2, and in Table 5 and Table 6, maximum quantities of layers supported by an uplink transmission of the UE on the two carriers of the band B are all 2. A maximum quantity of layers supported by an uplink transmission on a carrier of the band A is 1. In Table 7, maximum quantities of layers supported by an uplink transmission of the UE on the three carriers are all 4. The base station may determine, based on the maximum quantity of layers supported by an uplink transmission of the UE on different carriers reported by the UE, a switching rule in which table switching behavior of the UE corresponds (maximum quanadjustment also needs to be performed in the second time period. The UE temporarily interrupts an uplink transmission on the seventh carrier in the two second time periods and a period during which the SRS is sent on the eighth carrier. In a possible case, when the UE performs an SRS transmission on the eighth carrier (including any interruption due to an uplink or downlink radio frequency adjustment time, or including a second time period). The UE temporarily interrupts an uplink transmission on the seventh carrier.

It is assumed that the second carrier set is a set of carriers that are configured by the base station for the UE and on which an uplink radio frequency chain switching can be performed. In a possible case, the UE may perform dynamic uplink radio frequency chain switching on any two carriers in the second carrier set. In a possible case, the UE may perform dynamic uplink radio frequency chain switching on any two carriers on different bands in the second carrier set. In a possible case, the UE may perform dynamic uplink radio frequency chain switching on any two carriers that do not belong to a same first carrier set in the second carrier set. The ninth carrier and the tenth carrier are two carriers on which uplink radio frequency chain switching can be performed in the second carrier set.

The eleventh carrier does not belong to the second carrier set. It is assumed that SRS carrier switching is configured between the tenth carrier and the eleventh carrier. In some embodiments, the UE may switch a radio frequency chain from the tenth carrier (and/or the ninth carrier) to the eleventh carrier, so that the UE can transmit an SRS on the eleventh carrier. A cell corresponding to the eleventh carrier is not configured with a PUSCH. When an SRS transmission is performed on the eleventh carrier, an uplink transmission on the tenth carrier may be interrupted. The tenth carrier corresponds to the seventh carrier during SRS carrier switching described above, and the eleventh carrier corresponds to the eighth carrier during SRS carrier switching described above.

In a possible case, the UE needs to temporarily interrupt the uplink transmissions on the tenth carrier and/or the ninth carrier when an SRS is sent on the eleventh carrier and in two second time periods before and after the SRS is sent. In a possible case, during an SRS transmission on the eleventh carrier (including any interruption due to an uplink or downlink radio frequency adjustment time, or including a second time period), the UE temporarily interrupts the uplink transmissions on the tenth carrier and/or the ninth carrier, or the UE temporarily interrupts an uplink transmission on all carriers in the second carrier set.

In a possible case, the ninth carrier and the tenth carrier are located in different bands.

In a possible case, the ninth carrier and the tenth carrier belong to a same timing advance group (TAG).

In a possible case, the SRS transmission on the eleventh carrier and an uplink transmission on another carrier need to follow some drop and priority criteria. For example, when the seventh transmission performed by the UE on the ninth carrier or the tenth carrier overlaps the SRS transmission on the eleventh carrier in a time unit, the UE may determine, based on types of the seventh transmission and the SRS transmission on the eleventh carrier, which transmission is to be discarded. A radio frequency chain adjustment time (for example, a second time period) is required when the UE performs switching between two carriers on which SRS carrier switching is configured, and switching duration (for example, a first time period) is also required during switching of a radio frequency chain between two carriers on which uplink radio frequency chain switching is configured. However, both SRS carrier switching and uplink radio frequency chain switching are configured for the tenth carrier. Therefore, during SRS carrier switching, because of an interruption time (defined as a third time period) caused by radio frequency adjustment, the first time period and the second time period may need to be considered comprehensively. For example, the third time period is a larger value of the first time period and the second time period. In another example, the third time period is a sum of the first time period and the second time period. In another example, the third time period is equal to the first time period or the second time period. In another example, the third time period is a value reported by the UE other than the first time period and the second time period. In a possible case, although two carriers configured by the base station for SRS carrier switching are the tenth carrier and the eleventh carrier, because the ninth carrier and the tenth carrier share a radio frequency chain, the radio frequency chain may also need to be switched from the ninth carrier to the eleventh carrier, so that the eleventh carrier can send an SRS. Therefore, in addition to the second time period (a sixth time period for short) between the tenth carrier and the eleventh carrier, the second time period (a seventh time period for short) between the ninth carrier and the eleventh carrier may further need to be considered in the third time period. For example, the third time period is a larger value of the first time period, the sixth time period, and the seventh time period. In another example, the third time period is a larger value of a sum of the first time period and the seventh time period and a sum of the first time period and the sixth time period. In another example, the third time period is a sum of the first time period and the seventh time period. In another example, the third time period is the first time period, the sixth time period, or the seventh time period. In another example, the third time period is a value that is reported by the UE and that is different from the first time period, the sixth time period, and the seventh time period. In a possible case, the UE needs to temporarily interrupt the uplink transmission on the tenth carrier or the ninth carrier when an SRS is sent on the eleventh carrier and in two third time periods before and after the SRS is sent. In a possible case, during an SRS transmission on the eleventh carrier (including any interruption due to an uplink or downlink radio frequency adjustment time, or including a third time period), the UE temporarily interrupts the uplink transmissions on the tenth carrier and the ninth carrier, or the UE temporarily interrupts an uplink transmission on all carriers in the second carrier set.

For example, because both SRS carrier switching and uplink radio frequency chain switching are configured for the tenth carrier, when the SRS carrier switching is performed, radio frequency chains of the tenth carrier and/or the ninth carrier may be switched to the eleventh carrier. However, after the SRS of the eleventh carrier is sent, the UE needs to switch the radio frequency chain back. It is assumed that after the SRS of the eleventh carrier is sent, a state of the radio frequency chain of the UE after the UE switches back to the carrier (the tenth carrier and/or the ninth carrier) of the second carrier set is a first state. For example, the first state may be a state in which the radio frequency chain is on the tenth carrier, for example, a state after the radio frequency chain on the eleventh carrier is switched back to the tenth carrier. For example, the first state may be a state in which the radio frequency chain is on the ninth carrier, for example, a state after the radio frequency chain on the eleventh carrier is back to the ninth carrier. For example, the first state may be states of the radio frequency chains of the ninth carrier and the tenth carrier before SRS carrier switching, for example, after the SRS of the eleventh carrier is sent, the radio frequency chain is switched to the tenth carrier and/or the ninth carrier, so that quantities of radio frequency chains of the tenth carrier and the ninth carrier remain unchanged before and after the SRS carrier switching. For example, the first state may be a state determined by the UE, for example, the UE determines to switch the radio frequency chain on the eleventh carrier to the tenth carrier and/or the ninth carrier.

In a possible case, after sending of the SRS on the eleventh carrier is completed, the UE may perform radio frequency chain switching based on an indication of the first signaling. In a possible case, that the UE performs radio frequency chain switching based on an indication of the first signaling may be understood as that the UE determines a quantity of radio frequency chains of at least one carrier (or determines the ninth carrier and/or the tenth carrier) in the second carrier set based on the first signaling. For example, the first signaling may be signaling used for indicating the UE to perform an uplink transmission. For example, if the first signaling is before the first moment, after the SRS of the eleventh carrier is sent, the UE may perform radio frequency chain switching based on an indication of the first signaling before the first moment. For example, after the SRS of the eleventh carrier is sent, the quantity of radio frequency chains of the tenth carrier and the quantity of radio frequency chains of the ninth carrier obey the first signaling. For example, after the SRS of the eleventh carrier is sent, the quantity of radio frequency chains of the tenth carrier and the quantity of radio frequency chains of the ninth carrier obey the first signaling before the first moment. For example, the UE determines, based on the first signaling, a quantity of radio frequency chains of at least one carrier (or determines the ninth carrier and/or the tenth carrier) in the second carrier set after the SRS of the eleventh carrier is sent. For example, the first moment is an end moment of the last time unit of the SRS on the eleventh carrier. For example, the first moment is a start moment of the first time unit of the SRS on the eleventh carrier. For example, the first moment is a start moment of switching the radio frequency chain from the tenth carrier and/or the ninth carrier to the eleventh carrier. For example, the first moment is an end moment of switching the radio frequency chain from the tenth carrier and/or the ninth carrier to the eleventh carrier. For example, the first moment is a start moment of the first time unit in the closest second time period or third time period before an SRS is transmitted on the eleventh carrier. For example, the first moment is an end moment of the last time unit of the closest second time period or third time period before an SRS is transmitted on the eleventh carrier. For example, the first moment is a start moment of the first time unit of the first second time period or third time period after an SRS is transmitted on the eleventh carrier. For example, the first moment is determined by the third moment and the fourth time period that is reported by the UE. For example, the third moment may be an end moment of the last time unit or a start moment of the first time unit of the SRS on the eleventh carrier. For example, the third moment may be a start moment of the first time unit or an end moment of the last time unit of the closest second time period or third time period before an SRS is transmitted on the eleventh carrier. For example, the third moment may be a start moment of the first time unit or an end moment of the last time unit in the first second time period or third time period after an SRS is transmitted on the eleventh carrier. The first signaling may be DCI, RRC, or a media access control control element (MAC CE). For example, if the first signaling is after the first moment, after the SRS of the eleventh carrier is sent, instead of performing radio frequency chain switching based on an indication of the first signaling after the first moment, the UE switches to the first state.

In a possible case, the uplink transmission scheduled by using the first signaling is an uplink transmission on the tenth carrier and/or the ninth carrier. In a possible case, the uplink transmission scheduled by using the first signaling is located after the SRS transmission on the eleventh carrier in time domain, and is adjacent to the SRS transmission on the eleventh carrier in time domain. In a possible case, the uplink transmission scheduled by using the first signaling is the first uplink transmission after the SRS transmission on the eleventh carrier in time domain. For example, the first signaling may be physical downlink control channel (PDCCH) or radio resource control (RRC) signaling. For example, the uplink transmission scheduled by the first signaling may be sending of PUSCH/physical uplink control channel (PUCCH)/SRS/uplink control information (UCI) multiplexing. For example, a transmission scheduled by the first signaling may be a transmission in a next slot after SRS carrier switching, or a transmission in a remaining symbol in a slot in which SRS carrier switching is performed.

If the transmission scheduled by using the first signaling is a transmission on the ninth carrier or a transmission on the ninth carrier and the tenth carrier, the UE may directly switch a radio frequency chain to the ninth carrier or to the ninth carrier and the tenth carrier, to avoid that the UE first performs radio frequency chain switching from the eleventh carrier to the tenth carrier and then switching the radio frequency chain from the tenth carrier to the ninth carrier, so that the UE may directly switch a radio frequency chain that needs to be switched to the ninth carrier from the eleventh carrier to the ninth carrier, which helps reduce a quantity of times of radio frequency chain switching by the UE. Based on this solution, when both SRS carrier switching and uplink radio frequency chain switching are configured for the UE, for example, the ninth, tenth, and eleventh carriers are configured for the UE, the UE does not need to perform excessive radio frequency chain switching in a short time, to reduce complexity of the UE.

In a possible case, the last time unit (or a receiving end moment of the last time unit) of the first signaling is before the first time unit (or a sending start moment of the first time unit) of the SRS transmission on the eleventh carrier.

In a possible case, the smallest time interval between the last time unit (or the receiving end moment of the last time unit) of the first signaling and the first time unit (or the sending start moment of the first time unit) of the SRS transmission on the eleventh carrier is N2, or a sum of adding a time period to N2, for example, a sum of adding the second time period to N2, or a sum of adding the third time period to N2, or a sum of adding the first time period to N2. Optionally, in this case, the SRS transmission may be used to determine an uplink transmission codebook of the UE, or to switch an antenna of the UE.

In a possible case, the smallest time interval between the last time unit (or the receiving end moment of the last time unit) of the first signaling and the first time unit (or the sending start moment of the first time unit) of the SRS transmission on the eleventh carrier is a sum of adding 14 symbols and the second time period to N2, or a sum of adding 14 symbols and the third time period to N2, or a sum of adding 14 symbols and the first time period to N2. Optionally, in this case, the SRS transmission may be used to determine an uplink transmission non-codebook of the UE, or to select a beam.

N2 is an uplink transmission preparation time. Specifying the smallest time interval between the first signaling and the SRS transmission helps reserve a sufficient time for the UE to perform transmission preparation and radio frequency chain switching.

In a possible case, the second time period is an interruption time generated due to downlink radio frequency adjustment during switching between two carriers on which SRS carrier switching can be performed. In a possible case, the second time period is an interruption time generated due to uplink radio frequency adjustment during switching between two carriers on which SRS carrier switching can be performed. In a possible case, the second time period is a large value in an interruption time generated due to uplink radio frequency adjustment and an interruption time generated due to downlink radio frequency adjustment during switching between two carriers on which SRS carrier switching can be performed.

In a possible case, a time interval between the first time unit (or a sending start moment of the first time unit) of a transmission scheduled by using the first signaling and the last time unit (or a sending end moment of the last time unit) of radio frequency adjustment performed after the SRS transmission on the eleventh carrier ends should be less than or equal to a time period (for example, 13 symbols or one slot).

In a possible case, a time interval between the first time unit (or the sending start moment of the first time unit) of the transmission scheduled by using the first signaling and the last time unit (or the sending end moment of the last time unit) of the SRS transmission on the eleventh carrier should be less than or equal to a time period (for example, 14 symbols or 14 symbols plus the third time period). If the transmission scheduled by using the first signaling and the SRS transmission on the eleventh carrier are excessively close in time domain, excessive switching of the UE in a short time may be caused, which is unfavorable to implementation of the UE. Therefore, a radio frequency chain switching rule of the UE needs to be defined before the transmission scheduled by using the first signaling is performed on the UE at this time, to avoid excessive switching.

In a possible case, if the time interval between the first time unit (or a sending start moment of the first time unit) of a transmission scheduled by the first signaling and the last time unit (or a sending end moment of the last time unit) of radio frequency adjustment performed after the SRS transmission on the eleventh carrier ends is greater than a time period (for example, 13 symbols or one slot), after the SRS transmission on the eleventh carrier ends, the radio frequency chain is switched to the tenth carrier or switched to a carrier on which the radio frequency chain is located before the SRS is sent.

In a possible case, the time interval between the first time unit (or the sending start moment of the first time unit) of the transmission scheduled by the first signaling and the last time unit (or the sending end moment of the last time unit) of the SRS transmission on the eleventh carrier is greater than or equal to a time period (for example, 14 symbols or 14 symbols plus the third time period), after the SRS transmission on the eleventh carrier ends, the radio frequency chain is switched to the tenth carrier or switched to a carrier on which the radio frequency chain is located before the SRS is sent. If the interval between the transmission scheduled by using the first signaling and the SRS transmission on the eleventh carrier in time domain is greater than a threshold, a case in which the UE excessively switches a radio frequency chain in a short time does not occur. In this way, the UE can switch the radio frequency chain back to the tenth carrier after the SRS transmission, or a status of the radio frequency chain before the SRS is sent is maintained.

Optionally, in this application, a subcarrier spacing corresponding to the time unit is a subcarrier spacing with a larger value in the subcarrier spacing of the carrier on which the SRS transmission is located and the subcarrier spacing of the carrier on which the transmission indicated by the first signaling is located. In this way, when the subcarrier spacing is calculated, all three carriers do not need to be used, and a few carriers are used, to reduce complexity of the UE. Optionally, a subcarrier spacing corresponding to the time unit in this application is a maximum value of subcarrier spacings of the eleventh carrier, the ninth carrier, and the tenth carrier. In this way, when the subcarrier spacing is calculated, comparison is directly performed on the three carriers, and a carrier that a transmission is on indicated by the first signaling does not need to be considered. This can also reduce complexity of the UE.

In a possible case, the uplink transmission scheduled by using the first signaling is an uplink transmission after the SRS transmission on the eleventh carrier is performed, and a start moment (or the first time unit) of the uplink transmission scheduled by using the first signaling and a start moment (or the first time unit) of the eighth transmission are in a same time unit, for example, in a same slot or in 14 consecutive symbols. The eighth transmission is the last transmission that triggers uplink radio frequency chain switching before the SRS transmission on the eleventh carrier, and the eighth transmission is uplink transmissions on the tenth carrier and/or the ninth carrier. In this way, a case that the UE performs excessive radio frequency chain switching in a short time can be avoided. If a time interval between the uplink transmission scheduled by using the first signaling and previous uplink radio frequency chain switching is large, radio frequency chain switching of the UE may not be limited.

In a possible case, SRS carrier switching and uplink radio frequency chain switching are configured for the UE, the UE may perform SRS carrier switching on the eleventh carrier and the tenth carrier, and uplink radio frequency chain switching may be performed on the ninth carrier and the tenth carrier. After the UE performs the SRS transmission on the eleventh carrier (or performs the SRS transmission and radio frequency adjustment on the eleventh carrier), a status of the radio frequency chain of the UE is determined based on the first signaling. The first signaling is signaling used for indicating the UE to perform an uplink transmission. The uplink transmission scheduled by using the first signaling is an uplink transmission on the tenth carrier and/or the ninth carrier. The uplink transmission scheduled by using the first signaling is the first uplink transmission after the SRS transmission on the eleventh carrier in time domain. Optionally, the smallest time interval between the last time unit of the first signaling and the first time unit of the SRS transmission on the eleventh carrier is a sum of adding N2 and the switching duration of performing radio frequency chain switching on a band to which the ninth carrier belongs and a band to which the tenth carrier belongs that are reported by the UE. N2 is an uplink transmission preparation time.

Optionally, in this application, switching duration of performing radio frequency chain switching on the two carriers may be understood as switching duration of performing radio frequency chain switching on bands to which the two carriers belong.

The UE does not expect a quantity of times of uplink switching to exceed M in the fifth time period, where M is a positive integer. For example, M may be 1 or 2. For example, the fifth time period may be one or more time units. For example, the uplink switching includes uplink radio frequency chain switching performed by UE configured with uplink radio frequency chain switching. For example, the uplink switching includes SRS carrier switching performed by UE configured with SRS carrier switching. For example, the uplink switching includes uplink radio frequency chain switching and SRS carrier switching performed by UE that is configured with uplink radio frequency chain switching and is configured with SRS carrier switching. For example, the fifth time period is determined by a carrier with the largest or smallest subcarrier spacing in carriers on which uplink radio frequency chain switching is performed. For example, the fifth time period is determined by a carrier with the largest or smallest subcarrier spacing in the ninth carrier and the tenth carrier. For example, the fifth time period is determined by a carrier with the largest or smallest subcarrier spacing in carriers on which SRS carrier switching is performed. For example, the fifth time period is determined by a carrier with the largest or smallest subcarrier spacing in the tenth carrier and the eleventh carrier. For example, the fifth time period is determined by a carrier with the largest or smallest subcarrier spacing in carriers on which SRS carrier switching is performed and carriers on which uplink radio frequency chain switching is performed. For example, the fifth time period is determined by a carrier with the largest or smallest subcarrier spacing in the ninth carrier, the tenth carrier, and the eleventh carrier. For example, M may be a value reported by the UE. For example, the fifth time period may be a time period reported by the UE.

In a possible case, the tenth carrier in this application is replaced with at least one carrier in the second carrier set. In other words, SRS carrier switching may be configured for a plurality of carriers and the eleventh carrier. In a possible case, the ninth carrier in this application is replaced with at least one carrier other than the tenth carrier in the second carrier set.

In this application, one carrier corresponds to one cell, which is equivalent to that the carrier is a carrier of the cell, and equivalent to that the carrier belongs to the cell. In a possible case of this application, a transmission of the UE in a cell corresponding to one carrier is equivalent to a transmission of the UE on the carrier, and a configuration status of the UE in a cell corresponding to one carrier is equivalent to a configuration status of the UE on the carrier. In a possible case in this application, switching may be replaced with uplink switching, or may be replaced with radio frequency chain switching, or may be replaced with switching of a radio frequency chain, or may be replaced with uplink radio frequency chain switching, or may be replaced with dynamic uplink radio frequency chain switching, or may be replaced with radio frequency adjustment, or may be replaced with uplink radio frequency adjustment. The time unit in this application may be a symbol or an orthogonal frequency division multiplexing (OFDM) symbol or a slot or a frame or a subframe or a millisecond or a second.

In a possible case of this application, the first time period is duration that is reported by the UE and that is of performing uplink radio frequency chain switching on a carrier on which uplink radio frequency chain switching can be performed. In a possible case of this application, a carrier may be replaced with a band, or a carrier set may be replaced with a band set, one band set may include one or more bands, and a carrier in the carrier set may be replaced with a band on the band set. In a possible case of this application, one band includes one or more carriers. In a possible case of this application, a plurality of bands on the band set may have a same band, or may have different bands. In a possible case of this application, carriers in a band set include at least one carrier on at least one band in the band set.

Optionally, in this application, switching the radio frequency chain to one carrier is equivalent to switching to this carrier.

In an example, the UE reports at least two third carrier sets. The third carrier set is a set of carriers that are reported by the UE and on which an uplink radio frequency chain switching can be performed. In a possible case, the UE may perform dynamic uplink radio frequency chain switching on any two carriers in the third carrier set. In a possible case, the UE may perform dynamic uplink radio frequency chain switching on any two carriers on different bands in the third carrier set. In a possible case, the UE may perform dynamic uplink radio frequency chain switching on any two carriers that do not belong to a same first carrier set in the third carrier set. For example, two of the at least two third carrier sets reported by the UE are a fourth carrier set and a fifth carrier set, and both the fourth carrier set and the fifth carrier set are sets of carriers on which the UE can perform uplink radio frequency chain switching.

In a possible case, the UE reports at least two third carrier sets, and also reports the first time period corresponding to each third carrier set. The first time periods corresponding to each third carrier set may be the same or different. For example, when reporting a capability, the UE reports the fourth carrier set, the fifth carrier set, the first time period corresponding to the fourth carrier set, and the first time period corresponding to the fifth carrier set. The first time period corresponding to the fourth carrier set may be the same as or different from the first time period corresponding to the fifth carrier set. In a possible case, carriers in the fourth carrier set and the fifth carrier set are the same.

In a possible case, one third carrier set in the at least one third carrier set reported by the UE corresponds to one or more first time periods. If the third carrier set corresponds to a plurality of first time periods, values of the plurality of first time periods may be the same or different, or may be partially the same, or may be partially different. For example, one of the at least one third carrier set reported by the UE is a sixth carrier set. For example, when reporting a capability, the UE reports the sixth carrier set, and reports two first time periods corresponding to the sixth carrier set. Values of the two first time periods are different. In another example, when a maximum quantity of radio frequency chains supported on the at least one carrier in the sixth carrier set has a plurality of different values, values of the corresponding first time period are different, it is assumed that the sixth carrier set includes a twelfth carrier and a thirteenth carrier, and the maximum quantity of radio frequency chains supported by the thirteenth carrier is 2. The maximum quantity of radio frequency chains supported by the twelfth carrier may be 1 or 2. When the maximum quantity of radio frequency chains supported by the twelfth carrier is 1, the sixth carrier set corresponds to one first time period. When the maximum quantity of radio frequency chains supported by the twelfth carrier is 2, the sixth carrier set corresponds to another first time period. For example, when reporting a capability, the UE reports the sixth carrier set, and reports two first time periods corresponding to the sixth carrier set. Values of the two first time periods are same. In another example, when a maximum quantity of radio frequency chains supported on the at least one carrier in the sixth carrier set has a plurality of different values, values of two corresponding first time periods are same, it is assumed that the sixth carrier includes a twelfth carrier and a thirteenth carrier, and the maximum quantity of radio frequency chains supported by the thirteenth carrier is 2. The maximum quantity of radio frequency chains supported by the twelfth carrier may be 1 or 2. When the maximum quantity of radio frequency chains supported by the twelfth carrier is 1, the sixth carrier set corresponds to one first time period. When the maximum quantity of radio frequency chains supported by the twelfth carrier is 2, the sixth carrier set corresponds to another first time period. Values of the two first time periods are same. For example, when reporting a capability, the UE reports the sixth carrier set, and reports one first time period corresponding to the sixth carrier set. In another example, when a maximum quantity of radio frequency chains supported on the at least one carrier in the sixth carrier set has a plurality of different values, the values correspond to a same first time period, it is assumed that the sixth carrier includes a twelfth carrier and a thirteenth carrier, and the maximum quantity of radio frequency chains supported by the thirteenth carrier is 2. The maximum quantity of radio frequency chains supported by the twelfth carrier may be 1 or 2. When the maximum quantity of radio frequency chains supported by the twelfth carrier is 1, the sixth carrier set corresponds to the first time period. When the maximum quantity of radio frequency chains supported by the twelfth carrier is 2, the sixth carrier set also corresponds to the first time period.

In a possible case, the UE reports at least two third carrier sets, and also reports the at least one first time period. The at least one first time period is a first time period corresponding to one or more third carrier sets. For example, when reporting a capability, the UE reports the fourth carrier set, the fifth carrier set, and the first time period. Therefore, both the first time periods corresponding to the fourth carrier set and the fifth carrier set are first time periods reported by the UE.

In a possible case, the UE reports at least two third carrier sets, and the at least one second carrier set configured by the base station for the UE may correspond to at least two third carrier sets in the at least two third carrier sets reported by the UE. If related parameters of the at least two third carrier sets corresponding to the second carrier set are different, behavior of the UE is affected. For example, the fourth carrier set includes the twelfth carrier and the thirteenth carrier. A maximum quantity of radio frequency chains supported on the twelfth carrier is 1, and a maximum quantity of radio frequency chains supported on the thirteenth carrier is 2. The fifth carrier set includes the twelfth carrier and the thirteenth carrier. The maximum quantity of radio frequency chains supported on the twelfth carrier is 2, and the maximum quantity of radio frequency chains supported on the thirteenth carrier is 2. In this case, if the base station configures performing uplink radio frequency chain switching on the twelfth carrier and the thirteenth carrier for the UE, the maximum quantity of ports on the twelfth carrier is 1, and the maximum quantity of ports on the thirteenth carrier is 2, and the second carrier set includes the twelfth carrier and the thirteenth carrier. In this case, the second carrier set may correspond to the fourth carrier set and may also correspond to the fifth carrier set. For example, if the first time periods corresponding to the fourth carrier set and the fifth carrier set are different, uplink switching duration for which the UE performs uplink radio frequency chain switching on the twelfth carrier and the thirteenth carrier is ambiguous.

In a possible case, when the UE performs uplink radio frequency chain switching on the carrier in the configured second carrier set, a switching mode to which the UE obeys is determined by an SRS and/or a PUSCH parameter configured by the base station for the UE. The obeyed switching mode is selected from switching modes that are reported by the UE to the base station. In other words, a switching rule of the UE on the configured second carrier set corresponds to a switching rule corresponding to a third carrier set reported by the UE, and is determined by the SRS and/or the PUSCH parameter configured by the base station for the UE. In other words, a switching rule of the UE on the configured second carrier set corresponds to a switching rule corresponding to parameters (these parameters may include a maximum quantity of radio frequency chains on a carrier, may further include a maximum quantity of ports for a transmission on a carrier, and may further include a maximum quantity of layers supported by a transmission on a carrier) of a third carrier set reported by the UE, and is determined by the SRS and/or the PUSCH parameter configured by the base station for the UE. In a possible case, the switching rule or the switching mode corresponds to the switching rule or the switching mode corresponding to the table in this application. For example, the UE reports the fourth carrier set, the fifth carrier set, the first time period corresponding to the fourth carrier set, and the first time period corresponding to the fifth carrier set. The fourth carrier set includes the twelfth carrier and the thirteenth carrier, and the fifth carrier set includes the twelfth carrier and the thirteenth carrier. A maximum quantity of radio frequency chains supported on the twelfth carrier in the fourth carrier set is 1, and a maximum quantity of radio frequency chains supported on the thirteenth carrier in the fourth carrier set is 2. A maximum quantity of radio frequency chains supported on the twelfth carrier in the fifth carrier set is 2, and a maximum quantity of radio frequency chains supported on the thirteenth carrier in the fifth carrier set is 2. In another example, the UE reports a sixth carrier set and two first time periods. The two first time periods are first time periods corresponding to the sixth carrier set. The sixth carrier set includes a twelfth carrier and a thirteenth carrier. The maximum quantity of radio frequency chains supported by the thirteenth carrier is 2. The maximum quantity of radio frequency chains supported by the eleventh carrier may be 1 or 2. When the maximum quantity of radio frequency chains supported by the twelfth carrier is 1. The sixth carrier set corresponds to one of two first time periods. When the maximum quantity of radio frequency chains supported by the twelfth carrier is 2, the sixth carrier set corresponds to the other of the two first time periods. If the second carrier set configured by the base station for the UE includes the twelfth carrier and the thirteenth carrier, in other words, the base station configures performing uplink radio frequency chain switching on the twelfth carrier and the thirteenth carrier for the UE. The switching rule of the UE on the two carriers is determined by the SRS and/or the PUSCH parameter.

For example, if the maximum quantity of ports of the SRS resource on the twelfth carrier that is configured by the base station for the UE is 1 and the maximum quantity of ports of the SRS resource on the thirteenth carrier is 2, in this case, the switching rule of the UE on the twelfth carrier and the thirteenth carrier obeys the switching rule corresponding to the fourth carrier set (for example, the switching rule corresponding to Table 1. In another example, the first time period of the UE on the twelfth carrier and the thirteenth carrier is equal to the first time period corresponding to the fourth carrier set reported by the UE).

For example, if the maximum quantity of ports of the SRS resource on the twelfth carrier that is configured by the base station for the UE is 2 and the maximum quantity of ports of the SRS resource on the thirteenth carrier is 2, in this case, the switching rule of the UE on the twelfth carrier and the thirteenth carrier obeys the switching rule corresponding to the fifth carrier set (for example, the switching rule corresponding to Table 8. In another example, the first time period of the UE on the twelfth carrier and the thirteenth carrier is equal to the first time period corresponding to the fifth carrier set reported by the UE).

It should be noted that Table 8 shows an example of a solution for performing an uplink transmission between the UE and the base station. In the solution described in Table 8, the UE performs an uplink transmission on two carriers (a carrier 1 and a carrier 2), and the UE has two radio frequency chains. In the solution shown in Table 8, manners of performing an uplink transmission by the UE on the carrier 1 and the carrier 2 are classified into three states, in this example, a state 1, a state 2, and a state 3. It should be understood that solutions of the state 1 and the state 2 are similar to solutions of the state 1 and the state 2 in Table 1. Details are not described herein again in this application. In the state 3 shown in Table 8, the UE has two radio frequency chains (1 T) on the carrier 1, and has no radio frequency chain (0 T) on the carrier 2. The UE supports a 1-port uplink transmission or a 2-port uplink transmission on the carrier 1, and does not support an uplink transmission on the carrier 2.

TABLE 8

| | Quantity of radio frequency chains (a carrier 1 + a carrier 2) | Quantity of ports for an uplink transmission (a carrier 1 + a carrier 2) |
|---|---|---|
| State 1 | 1T + 1T | 1p + 0p, 1p + 1p, 0p + 1p |
| State 2 | 0T + 2T | 0p + 2p, 0p + 1p |
| State 3 | 2T + 0T | 2p + 0p, 1p + 0p |

For example, if the maximum quantity of ports of the SRS resource on the twelfth carrier that is configured by the base station for the UE is 1 and the maximum quantity of ports of the SRS resource on the thirteenth carrier is 2, in this case, the switching rule of the UE on the twelfth carrier and the thirteenth carrier obeys a corresponding switching rule when the maximum quantity of radio frequency chains supported by the twelfth carrier in the sixth carrier set is 1 (for example, the switching rule corresponding to Table 1. In another example, the first time period of the UE on the twelfth carrier and the thirteenth carrier is equal to the first time period corresponding to the sixth carrier set when the maximum quantity of radio frequency chains supported by the twelfth carrier reported by the UE is 1).

For example, if the maximum quantity of ports of the SRS resource on the twelfth carrier that is configured by the base station for the UE is 2 and the maximum quantity of ports of the SRS resource on the thirteenth carrier is 2, in this case, the switching rule of the UE on the twelfth carrier and the thirteenth carrier objects a corresponding switching rule when the maximum quantity of radio frequency chains supported by the twelfth carrier in the sixth carrier set is 2 (for example, the switching rule corresponding to Table 1. In another example, the first time period of the UE on the twelfth carrier and the thirteenth carrier is equal to the first time period corresponding to the sixth carrier set when the maximum quantity of radio frequency chains supported by the twelfth carrier reported by the UE is 2).

In a possible case, if the switching rules corresponding to the sixth carrier sets reported by the UE are the same, or values of the first time periods corresponding to the sixth carrier sets are the same, or the sixth carrier sets have only one corresponding first time period, the switching rule of the UE does not need to be distinguished by using the SRS and/or the PUSCH parameter configured by the base station for the UE.

In a possible case, if the switching rules corresponding to the fourth carrier set and the fifth carrier set reported by the UE are the same, or values of the first time periods corresponding to the fourth carrier set and the fifth carrier set are the same, or the fourth carrier set and the fifth carrier set correspond to a same first time period, the switching rule of the UE does not need to be distinguished by using the SRS and/or the PUSCH parameter configured by the base station for the UE.

In a possible case, the terminal device reports the sixth carrier set to the network device. A maximum quantity of radio frequency chains supported on at least one carrier in the sixth carrier set has a plurality of different values, and at the same time the terminal device reports only one first time period related to the sixth carrier set. Therefore, regardless of a maximum quantity of radio frequency chains on at least one carrier configured by the network device for the terminal device (or regardless of a maximum quantity of ports of SRS resources on at least one carrier that is configured by the network device for the terminal device), the corresponding first time period when the terminal device performs radio frequency chain switching on the carrier in the sixth carrier set is the first time period that is reported by the terminal device and that is related to the sixth carrier set.

In a possible case, the UE reports the sixth carrier set to the base station, and the UE reports at least one first time period corresponding to the sixth carrier set. If the UE reports a plurality of first time periods corresponding to the sixth carrier set, the corresponding first time period when the UE performs radio frequency chain switching on the at least one carrier (the at least one carrier belongs to the sixth carrier set) is determined by the SRS and/or the PUSCH parameter configured by the base station on the at least one carrier. If the UE reports only one first time period corresponding to the sixth carrier set, regardless of the maximum quantity of radio frequency chains on at least one carrier (the at least one carrier belongs to the sixth carrier set) that is configured by the base station for the UE and on which radio frequency chain switching can be performed (or regardless of the maximum quantity of ports of SRS resources on at least one carrier (the at least one carrier belongs to the sixth carrier set) that is configured by the base station for the UE and on which radio frequency chain switching can be performed), the corresponding first time period when the UE performs radio frequency chain switching on the at least one carrier is a first time period that is reported by the UE and that is related to the sixth carrier set.

In a possible case, the maximum quantity of ports of SRS resources is equal to the maximum quantity of ports of all periodic SRS resources, semi-persistent SRS resources, and aperiodic SRS resources configured by the base station. In a possible case, the maximum quantity of ports of SRS resources is equal to the maximum quantity of ports of all periodic SRS resources, active semi-persistent SRS resources, and aperiodic SRS resources configured by the base station.

In a possible case in this application, the switching rule is equivalent to a switching mode.

For Table 8, if the UE is in the state 3 and is about to send a 1-port uplink transmission on the carrier 2, the UE needs to perform radio frequency chain switching because the state 3 does not support sending of an uplink transmission on the carrier 2. However, in this case, the UE is uncertain whether to switch to the state 1 to send a 1-port transmission or switch to the state 2 to send a 1-port transmission. Because both the state 1 and the state 2 support sending of a 1-port transmission on the carrier 2.

Similarly, if the UE is in the state 2 and is about to send a 1-port uplink transmission on the carrier 1, the UE needs to perform radio frequency chain switching because the state 2 does not support sending of an uplink transmission on the carrier 1. However, in this case, the UE is uncertain whether to switch to the state 1 to send a 1-port transmission or switch to the state 3 to send a 1-port transmission. Because both the state 1 and the state 3 support sending of a 1-port transmission on the carrier 1.

When reporting a capability, the UE may report a state to which the UE is switched for sending in this case. In other words, when reporting a capability, the UE may report, in this case, whether the UE uses 1 Tx or 2 Tx to send the 1-port transmission. The UE reports fifth information, where the fifth information indicates a state of the UE when the UE needs to perform uplink radio frequency chain switching to perform a sixth transmission. In a possible case, the status of the UE may be replaced with a status of a radio frequency chain of the UE, a quantity of radio frequency chains of the UE on at least one carrier, a port status of an uplink transmission supported by the UE on the at least one carrier, an operating status of the UE, a port status of an uplink transmission supported by the UE on a carrier on which a transmission is to be performed is located, or a port status of an uplink transmission supported by the UE on the carrier on which the sixth transmission is located, a quantity of radio frequency chains of the UE on the carrier on which a transmission is to be performed is located, or a quantity of radio frequency chains of the UE on the carrier on which the sixth transmission is located. Alternatively, the fifth information indicates a quantity of radio frequency chains on a carrier on which the sixth transmission is located when the UE needs to perform uplink radio frequency chain switching to perform the sixth transmission. In other words, the UE is about to perform a sixth transmission, and does not perform an uplink transmission on at least a carrier on which the sixth transmission is located in the first time period. A status of the UE during the sixth transmission is determined by the fifth information. The fifth information is reported by the UE. The sixth transmission is an uplink transmission supported by statuses of at least two radio frequency chains in a process in which the UE performs radio frequency chain switching. In other words, the quantity of ports of the sixth transmission is less than the maximum quantity of radio frequency chains supported by the carrier on which the sixth transmission is located. In other words, the sixth transmission is an uplink transmission supported by statuses of at least two radio frequency chains of the carrier on which the sixth transmission is located.

For example, for Table 8, if the UE reports the fifth information, the UE is in the state 3, and the UE is about to send a 1-port uplink transmission on the carrier 2, the UE switches to the state 2 to send the 1-port uplink transmission. The fifth information indicates that if the UE has two radio frequency chains on one carrier and is about to send a 1-port uplink transmission on another carrier, the UE is switched to the carrier on which the two radio frequency chains are switched to the carrier on which the 1-port transmission is transmitted, and the UE sends a 1-port transmission.

For example, for Table 8, if the UE reports the fifth information, the UE is in the state 3, and the UE is about to send a 1-port uplink transmission on the carrier 2, the UE switches to the state 1 to send the 1-port uplink transmission. The fifth information indicates that if the UE has two radio frequency chains on one carrier and is about to send a 1-port uplink transmission on another carrier, the UE is switched to the carrier on which the one radio frequency chain is switched to the carrier on which the 1-port transmission is transmitted, and the UE sends a 1-port transmission.

For example, for Table 8, if the UE reports the fifth information, the UE is in the state 2, and the UE is about to send a 1-port uplink transmission on the carrier 1, the UE switches to the state 3 to send the 1-port uplink transmission. The fifth information indicates that if the UE has two radio frequency chains on one carrier and is about to send a 1-port uplink transmission on another carrier, the UE is switched to the carrier on which the two radio frequency chains are switched to the carrier on which the 1-port transmission is transmitted, and the UE sends a 1-port transmission.

For example, for Table 8, if the UE reports the fifth information, the UE is in the state 2, and the UE is about to send a 1-port uplink transmission on the carrier 1, the UE switches to the state 1 to send the 1-port uplink transmission. The fifth information indicates that if the UE has two radio frequency chains on one carrier and is about to send a 1-port uplink transmission on another carrier, the UE is switched to the carrier on which the one radio frequency chain is switched to the carrier on which the 1-port transmission is transmitted, and the UE sends a 1-port transmission. In a possible case, a maximum quantity of radio frequency chains supported by the UE on one carrier is equal to or replaced with a maximum quantity of ports that are of SRS resources on the carrier and that is configured by the base station for the UE.

In a possible case, the maximum quantity of radio frequency chains supported by the UE on one carrier is equal to or replaced with a maximum quantity of ports that is of SRS resources on a band to which the carrier belongs and that is reported by the UE, and/or a maximum quantity of layers supported by an uplink transmission on the carrier, and/or the largest value of one or more values in the maximum quantity of SRS resources in an SRS resource set in a non-codebook transmission scenario on the carrier.

In a possible case in this application, the maximum quantity of radio frequency chains supported by one carrier may be replaced with a maximum quantity of radio frequency chains supported by one carrier.

The methods provided in embodiments of this application are described above in detail with reference to FIG. 2 and FIG. 3. A communication apparatus provided in embodiments of this application is described below in detail with reference to FIG. 4 to FIG. 7.

FIG. 4 is a schematic block diagram of a communication apparatus 10 according to an embodiment of this application. As shown in the figure, a communication apparatus 10 may include a transceiver module 11 and a processing module 12.

In a possible design, the communication apparatus 10 may correspond to the terminal device or the UE in the foregoing method embodiments.

For example, the communication apparatus 10 may correspond to the terminal device or the UE in the method 200 according to an embodiment of this application. The communication apparatus 10 may include modules configured to perform the method performed by the terminal device or the UE in the method 200 in FIG. 2. In addition, the units in the communication apparatus 10 and the foregoing other operations and/or functions are respectively used to implement a corresponding procedure of the method 200.

The transceiver module 11 in the communication apparatus 10 performs receiving and sending operations performed by the terminal device or the UE in the foregoing method embodiments, and the processing module 12 performs operations other than the receiving and sending operations.

In another possible design, the communication apparatus 10 may correspond to the network device or the base station in the foregoing method embodiments.

For example, the communication apparatus 10 may correspond to the network device or the base station in the method 200 according to an embodiment of this application. The communication apparatus 10 may include modules configured to perform the method performed by the network device or the base station in the method 200 in FIG. 2. In addition, the units in the communication apparatus 10 and the foregoing other operations and/or functions are respectively used to implement a corresponding procedure of the method 200.

The transceiver module 11 in the communication apparatus 10 performs receiving and sending operations performed by the network device or the base station in the foregoing method embodiments, and the processing module 12 performs operations other than the receiving and sending operations.

According to the foregoing method, FIG. 5 is a schematic diagram of a communication apparatus 20 according to an embodiment of this application. As shown in FIG. 5, the apparatus 20 may be a terminal device, or may be a network device.

The apparatus 20 may include a processor 21 (an example of the processing module) and a memory 22. The memory 22 is configured to store instructions, and the processor 21 is configured to execute the instructions stored in the memory 22, so that the apparatus 20 implements the steps performed in the method corresponding to FIG. 2.

Further, the apparatus 20 may further include an input port 23 (an example of the transceiver module) and an output port 24 (another example of the transceiver module). Further, the processor 21, the memory 22, the input port 23, and the output port 24 may communicate with each other through an internal connection path, to transmit a control signal and/or a data signal. The memory 22 is configured to store a computer program. The processor 21 may be configured to invoke and run the computer program from the memory 22, to control the input port 23 to receive a signal, control the output port 24 to send a signal, and complete the steps of the network device in the foregoing method. The memory 22 may be integrated into the processor 21, or may be disposed separately from the processor 21.

Optionally, if the communication apparatus 20 is a communication device, the input port 23 is a receiver, and the output port 24 is a transmitter. The receiver and the transmitter may be a same physical entity or different physical entities. When being the same physical entity, the receiver and the transmitter may be collectively referred to as a transceiver.

Optionally, If the communication apparatus 20 is a chip or a circuit, the input port 23 is an input interface, and the output port 24 is an output interface.

In an implementation, it may be considered that functions of the input port 23 and the output port 24 are implemented through a transceiver circuit or a dedicated transceiver chip. It may be considered that the processor 21 is implemented through a dedicated processing chip, a processing circuit, a processor, or a general-purpose chip.

In another implementation, it may be considered that the communication device provided in this embodiment of this application is implemented by using a general-purpose computer. In some embodiments, program code for implementing functions of the processor 21, the input port 23, and the output port 24 is stored in the memory 22, and the general-purpose processor implements the functions of the processor 21, the input port 23, and the output port 24 by executing the code in the memory 22.

For concepts, explanations, detailed descriptions, and other steps of the apparatus 20 that are related to the technical solutions provided in embodiments of this application, refer to the descriptions of the content in the foregoing methods or other embodiments. Details are not described herein again.

Figure 6:
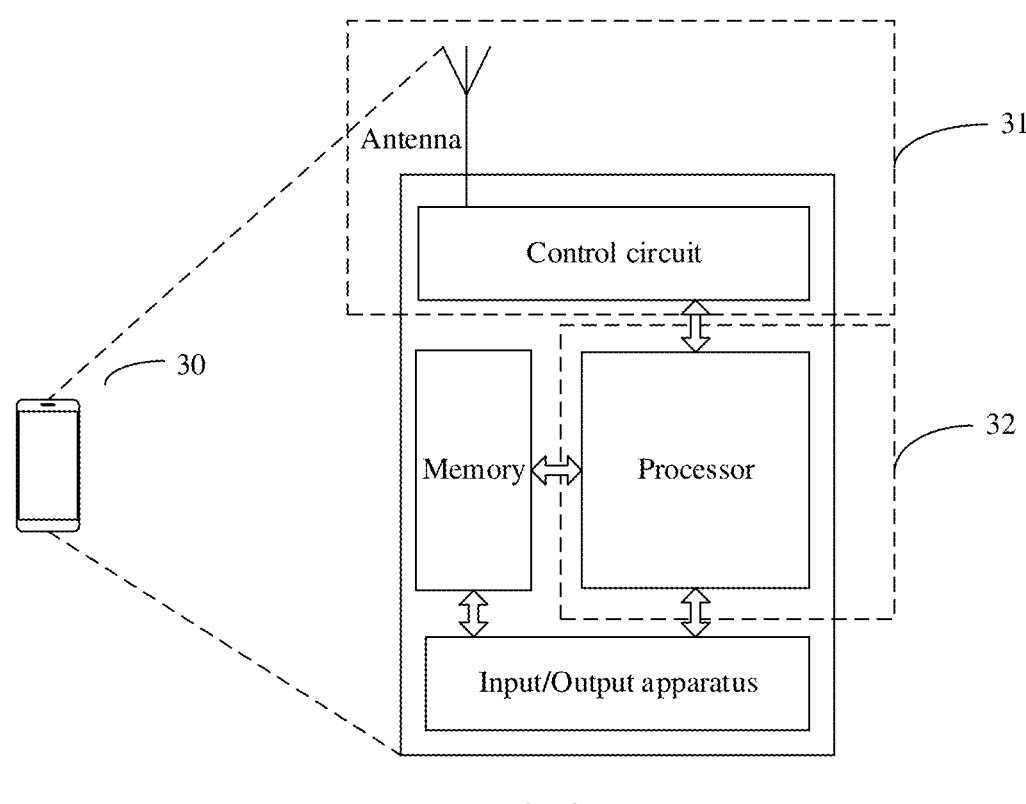
FIG. 6 is a schematic diagram of a structure of an example of a terminal device according to this application.

FIG. 6 is a schematic diagram of a structure of a communication apparatus 30 according to this application. For ease of description, FIG. 6 shows only main components of the communication apparatus. As shown in FIG. 6, the communication apparatus 30 includes a processor, a memory, a control circuit, an antenna, and an input/output apparatus.

The processor is mainly configured to process a communication protocol and communication data, control an entire terminal device, execute a software program, and process data of the software program, for example, is configured to support the terminal device to perform the actions described in the foregoing embodiments of the indication method for transmitting a precoding matrix. The memory is mainly configured to store the software program and the data, for example, store a codebook described in the foregoing embodiments. The control circuit is mainly configured to convert a baseband signal and a radio frequency signal and process the radio frequency signal. The control circuit and the antenna together may also be referred to as a transceiver, and are mainly configured to send and receive a radio frequency signal in a form of an electromagnetic wave. The input/output apparatus, such as a touchscreen, a display, or a keyboard, is mainly configured to: receive data input by a user and output data to the user.

After the communication apparatus is powered on, the processor may read a software program in a storage unit, explain and execute instructions of the software program, and process data of the software program. When data needs to be sent in a wireless manner, the processor performs baseband processing on the to-be-sent data, and then outputs a baseband signal to a radio frequency circuit. The radio frequency circuit performs radio frequency processing on the baseband signal, and then sends, through the antenna, a radio frequency signal in an electromagnetic wave form. When data is sent to the terminal device, the radio frequency circuit receives the radio frequency signal through the antenna, converts the radio frequency signal into a baseband signal, and outputs the baseband signal to the processor. The processor converts the baseband signal into data, and processes the data.

A person skilled in the art may understand that, for ease of description, FIG. 6 shows only one memory and only one processor. In an actual terminal device, there may be a plurality of processors and memories. The memory may also be referred to as a storage medium, a storage device, or the like. This is not limited in embodiments of this application.

In an optional implementation, the processor may include a baseband processor and a central processing unit. The baseband processor is mainly configured to process the communication protocol and the communication data. The central processing unit is mainly configured to: control the entire terminal device, execute the software program, and process the data of the software program. The processor in FIG. 6 integrates functions of the baseband processor and the central processing unit. A person skilled in the art may understand that the baseband processor and the central processing unit may alternatively be processors independent of each other, and are interconnected by using a technology such as a bus. A person skilled in the art may understand that the terminal device may include a plurality of baseband processors to adapt to different network standards, and the terminal device may include a plurality of central processing units, to enhance processing capabilities of the terminal device, and components of the terminal device may be connected by using various buses. The baseband processor may also be expressed as a baseband processing circuit or a baseband processing chip. The central processing unit may alternatively be expressed as a central processing circuit or a central processing chip. A function of processing a communication protocol and communication data may be built in the processor; or may be stored in the storage unit in a form of a software program, and the processor executes the software program to implement a baseband processing function.

As shown in FIG. 6, the communication apparatus 30 includes a transceiver unit 31 and a processing unit 32. The transceiver unit may also be referred to as a transceiver machine, a transceiver, a transceiver apparatus, or the like. Optionally, a component that is in the transceiver unit 31 and that is configured to implement a receiving function may be considered as a receiving unit, and a component that is in the transceiver unit 31 and that is configured to implement a sending function may be considered as a sending unit. In some embodiments, the transceiver unit 31 includes the receiving unit and the sending unit. For example, the receiving unit may also be referred to as a receiver machine, a receiver, a receiver circuit, or the like. The sending unit may be referred to as a transmitter machine, a transmitter, a transmitter circuit, or the like.

The terminal device shown in FIG. 6 may perform actions performed by the terminal device or the UE in the foregoing method 200. To avoid repetition, detailed description thereof is omitted herein.

Figure 7:
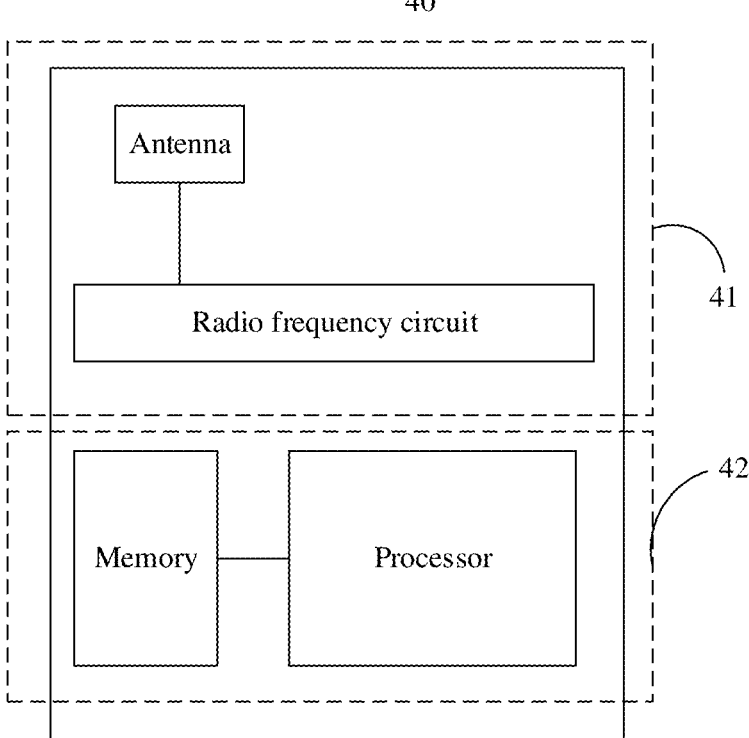
FIG. 7 is a schematic diagram of a structure of an example of a network device according to this application.

FIG. 7 is a schematic diagram of a structure of a simplified network device 40. The network device includes a part 41 and part 42. The part 41 is mainly configured to transmit and receive a radio frequency signal and convert a radio frequency signal and a baseband signal. The part 42 is mainly configured to perform baseband processing, control the network device, and the like. The part 41 may be generally referred to as a transceiver module, a transceiver, a transceiver circuit, or the like. The part 42 is generally a control center of the network device, and may be generally referred to as a processing module, and is configured to control the network device to perform a processing operation on a network device side in the foregoing method embodiment.

The transceiver module in the part 41 may also be referred to as a transceiver, or the like, and includes an antenna and a radio frequency circuit. The radio frequency circuit is mainly configured to perform radio frequency processing. For example, a component that is in the part 41 and that is configured to implement a receiving function may be considered as a receiving module, and a component that is configured to implement a sending function may be considered as a sending module. In other words, the part 41 includes a receiving module and a sending module. The receiving module may also be referred to as a receiver, a receiving circuit, or the like, and the sending module may be referred to as a transmitter, a transmitting circuit, or the like.

The part 42 may include one or more boards, and each board may include one or more processors and one or more memories. The processor is configured to read and execute a program in the memory to implement a baseband processing function and control the network device. If there are a plurality of boards, the boards may be interconnected with each other, to enhance a processing capability. In an optional implementation, a plurality of boards may share one or more processors, or a plurality of boards share one or more memories, or a plurality of boards share one or more processors at the same time.

For example, in an implementation, the transceiver module in the part 41 is configured to perform steps related to sending and receiving of the network device or the base station in FIG. 2. The part 42 is configured to perform processing-related steps of the network device or the base station in FIG. 2.

It should be understood that FIG. 7 is merely an example rather than a limitation, and the foregoing network device including the transceiver module and the processing module may not depend on the structure shown in FIG. 7.

When the network device 40 is a chip, the chip includes a transceiver module and a processing module. The transceiver module may be an input/output circuit or a communication interface. The processing module is a processor, a microprocessor, or an integrated circuit integrated on the chip.

An embodiment of this application further provides a computer-readable storage medium. The computer-readable storage medium stores computer instructions used for implementing the method performed by the network device in the foregoing method embodiments.

For example, when the computer program is executed by a computer, the computer can implement the method performed by the network device in the foregoing method embodiments.

An embodiment of this application further provides a computer program product including instructions. When the instructions are executed by a computer, the computer implements the method performed by the first device or the method performed by the second device in the foregoing method embodiments.

An embodiment of this application further provides a communication system. The communication system includes the network device in the foregoing embodiments.

For explanations and beneficial effects of related content in any one of the foregoing provided communication apparatuses, refer to the corresponding method embodiments provided above. Details are not described herein again.

In embodiments of this application, the network device may include a hardware layer, an operating system layer running above the hardware layer, and an application layer running above the operating system layer. The hardware layer may include hardware such as a central processing unit (CPU), a memory management unit ( ), and memory (also referred to as main memory). An operating system at the operating system layer may be any one or more computer operating systems that implement service processing by using a process, for example, a Linux operating system, a Unix operating system, an Android operating system, an iOS operating system, or a Windows operating system. The application layer may include applications such as a browser, an address book, word processing software, and instant messaging software.

A specific structure of an execution body of the method provided in embodiments of this application is not particularly limited in embodiments of this application, provided that communication can be performed according to the method provided in embodiments of this application by running a program that records code of the method provided in embodiments of this application. For example, the method provided in embodiments of this application may be executed by a network device, or a function module in the network device that can invoke and execute a program.

Various aspects or features of this application may be implemented as methods, apparatuses, or products using standard programming and/or engineering techniques. As used herein, the term "artificial article" may encompass a computer program accessible from any computer-readable device, carrier, or medium. For example, a computer-readable medium may include, but is not limited to: a magnetic storage device (for example, a hard disk, a floppy disk, or a magnetic tape), an optical disc (for example, a compact disc (CD), a digital versatile disc (DVD), or the like), a smart card, and a flash memory device (for example, an erasable programmable read-only memory (EPROM), a card, a stick, or a key drive).

The various storage media described herein may represent one or more devices and/or other machine-readable media for storing information. The term "machine-readable medium" may include, but is not limited to: radio channels and various other media capable of storing, containing, and/or carrying instructions and/or data.

It should be understood that, the processor mentioned in embodiments of this application may be a central processing unit (CPU), and may further be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor, or the like.

It should also be understood that the memory in embodiments of this application may be a volatile memory or a nonvolatile memory, or may include a volatile memory and a nonvolatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM). For example, the RAM can be used as an external cache. As an example instead of a limitation, the RAM may include a plurality of forms below: a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synchlink DRAM, SLDRAM), and a direct rambus random access memory (direct rambus RAM, DR RAM).

It should be noted that when the processor is a general purpose processor, a DSP, an ASIC, an FPGA or another programmable logic device, a discrete gate or a transistor logic device, or a discrete hardware component, a memory (storage module) may be integrated into the processor.

It should further be noted that the memory described herein is intended to include, but is not limited to, these and any other suitable type of memory.

A person of ordinary skill in the art may be aware that, in combination with the examples described in embodiments disclosed in this specification, units and steps can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the protection scope of this application.

It may be clearly understood by a person skilled in the art that, for the purpose of convenient and brief description, for a detailed working process of the apparatuses and units described above, reference may be made to a corresponding process in the foregoing method embodiments, and details are not described herein.

In the several embodiments provided in this application, it should be understood that the disclosed apparatus and method may be implemented in other manners. For example, the described apparatus embodiments are merely examples. For example, division into the units is merely logical function division. There may be another division manner during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, and may be located at one location, or may be distributed on a plurality of network units. A part or all of the units may be selected based on actual requirements to implement the solutions provided in this application.

In addition, function units in embodiments of this application may be integrated into one unit, each of the units may exist alone physically, or two or more units are integrated into one unit.

All or a part of the foregoing embodiments may be implemented by software, hardware, firmware, or any combination thereof. When software is used to implement the embodiments, all or a part of the embodiments may be implemented in a form of a computer program product. The computer program product includes one or more computer instructions. When the computer program instructions are loaded and executed on a computer, the procedures or functions according to embodiments of this application are all or partially generated. The computer may be a general-purpose computer, a dedicated computer, a computer network, or any other programmable apparatus. For example, the computer may be a personal computer, a server, a network device, or the like. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state disk (SSD)). For example, the foregoing usable media may include but are not limited to: any medium that can store program code, for example, a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims and the specification.

What is claimed is:

1. A communication method, comprising:

reporting a fourth band set and a fifth band set; wherein the fourth band set includes a twelfth band and a thirteenth band, the fifth band set includes the twelfth band and the thirteenth band, a maximum quantity of layers supported by uplink transmission on the twelfth band of the fourth band set is 1, and a maximum quantity of layers supported by uplink transmission on the thirteenth band of the fourth band set is 2; a maximum quantity of layers supported by uplink transmission on the twelfth band of the fifth band set is 2, and a maximum quantity of layers supported by uplink transmission on the thirteenth band of the fifth band set is 2;

receiving fourth information, wherein the fourth information indicates transmitter (Tx) switching on the twelfth band and the thirteenth band; and performing Tx switching on the twelfth band and the thirteenth band based on parameters of a sounding reference signal (SRS).

2. The communication method according to claim 1, wherein a Tx switching duration on bands of the fourth band set is a first time period, and a Tx switching duration on bands of the fifth band set is a second time period.

3. The communication method according to claim 2, wherein the parameters of the SRS comprise a maximum quantity of ports of SRS resources.

4. The communication method according to claim 3, wherein a maximum quantity of ports of SRS resources on the twelfth band is 2 and a maximum quantity of ports of SRS resources on the thirteenth band is 2, and a Tx switching duration for performing Tx switching on the twelfth band and the thirteenth band is the second time period.

5. The communication method according to claim 3, wherein a maximum quantity of ports of SRS resources on the twelfth band is 1, and a maximum quantity of ports of SRS resources on the thirteenth band is 2, and a Tx switching duration for performing Tx switching on the twelfth band and the thirteenth band is the first time period.

6. The communication method according to claim 1, further comprising:

receiving configuration information, wherein the configuration information indicates the parameters of the SRS.

7. A communication method, comprising:

receiving a fourth band set and a fifth band set; wherein the fourth band set includes a twelfth band and a thirteenth band, the fifth band set includes the twelfth band and the thirteenth band, a maximum quantity of layers supported by uplink transmission on the twelfth band of the fourth band set is 1, and a maximum quantity of layers supported by uplink transmission on the thirteenth band of the fourth band set is 2; a maximum quantity of layers supported by uplink transmission on the twelfth band of the fifth band set is 2, and a maximum quantity of layers supported by uplink transmission on the thirteenth band of the fifth band set is 2;

sending fourth information, wherein the fourth information indicates transmitter (Tx) switching on the twelfth band and the thirteenth band; and sending configuration information, wherein the configuration information indicates parameters of a sounding reference signal (SRS) for the Tx switching.

8. The communication method according to claim 7, wherein a Tx switching duration on bands of the fourth band set is a first time period, and Tx switching duration on bands of the fifth band set is a second time period.

9. The communication method according to claim 8, wherein the parameters of the SRS comprise a maximum quantity of ports of SRS resources.

10. The communication method according to claim 9, wherein a maximum quantity of ports of SRS resources on the twelfth band is 2 and a maximum quantity of ports of SRS resources on the thirteenth band is 2, and a Tx switching duration for performing Tx switching on the twelfth band and the thirteenth band is the second time period.

11. The communication method according to claim 9, wherein a maximum quantity of ports of SRS resources on the twelfth band is 1, and a maximum quantity of ports of SRS resources on the thirteenth band is 2, and a Tx switching duration for performing Tx switching on the twelfth band and the thirteenth band is the first time period.

12. A communication apparatus, comprising:

one or more processors; and a memory having instructions stored thereon that, when executed by the one or more processors, causes the communication apparatus to:

report a fourth band set and a fifth band set; wherein the fourth band set includes a twelfth band and a thirteenth band, the fifth band set includes the twelfth band and the thirteenth band, a maximum quantity of layers supported by uplink transmission on the twelfth band of the fourth band set is 1, and a maximum quantity of layers supported by uplink transmission on the thirteenth band of the fourth band set is 2; a maximum quantity of layers supported by uplink transmission on the twelfth band of the fifth band set is 2, and a maximum quantity of layers supported by uplink transmission on the thirteenth band of the fifth band set is 2;

receive fourth information, wherein the fourth information indicates transmitter (Tx) switching on the twelfth band and the thirteenth band; and perform Tx switching on the twelfth band and the thirteenth band based on parameters of a sounding reference signal (SRS).

13. The communication apparatus according to claim 12, wherein a Tx switching duration on bands of the fourth band set is a first time period, and a Tx switching duration on bands of the fifth band set is a second time period.

14. The communication apparatus according to claim 13, wherein the parameters of the SRS comprise a maximum quantity of ports of SRS resources.

15. The communication apparatus according to claim 14, wherein a maximum quantity of ports of SRS resources on the twelfth band is 2 and a maximum quantity of ports of SRS resources on the thirteenth band is 2, and a Tx switching duration for performing Tx switching on the twelfth band and the thirteenth band is the second time period.

16. The communication apparatus according to claim 14, wherein a maximum quantity of ports of SRS resources on the twelfth band is 1, and a maximum quantity of ports of SRS resources on the thirteenth band is 2, and a Tx switching duration for performing Tx switching on the twelfth band and the thirteenth band is the first time period.

17. The communication apparatus according to claim 12, wherein the communication apparatus is further caused to:

receive configuration information, the configuration information indicates the parameters of the SRS.

18. A communication apparatus, comprising:

one or more processors; and a memory having instructions stored thereon that, when executed by the one or more processors, causes the communication apparatus to:

receive a fourth band set and a fifth band set; wherein the fourth band set includes a twelfth band and a thirteenth band, the fifth band set includes the twelfth band and the thirteenth band, a maximum quantity of layers supported by uplink transmission on the twelfth band of the fourth band set is 1, and a maximum quantity of layers supported by uplink transmission on the thirteenth band of the fourth band set is 2; a maximum quantity of layers supported by uplink transmission on the twelfth band of the fifth band set is 2, and a maximum quantity of layers supported by uplink transmission on the thirteenth band of the fifth band set is 2;

send fourth information, wherein the fourth information indicates transmitter (Tx) switching on the twelfth band and the thirteenth band; and send configuration information, wherein the configuration information indicates parameters of a sounding reference signal (SRS) for the Tx switching.

19. The communication apparatus according to claim 18, wherein a Tx switching duration on bands of the fourth band set is a first time period, and Tx switching duration on bands of the fifth band set is a second time period.

20. The communication apparatus according to claim 19, the parameters of the SRS comprise a maximum quantity of ports of SRS resources.

21. The communication apparatus according to claim 20, wherein a maximum quantity of ports of SRS resources on the twelfth band is 2 and a maximum quantity of ports of SRS resources on the thirteenth band is 2, and a Tx switching duration for performing Tx switching on the twelfth band and the thirteenth band is the second time period.

22. The communication apparatus according to claim 20, wherein a maximum quantity of ports of SRS resources on the twelfth band is 1, and a maximum quantity of ports of SRS resources on the thirteenth band is 2, and a Tx switching duration for performing Tx switching on the twelfth band and the thirteenth band is the first time period.

* * * * *